(12) United States Patent
Bober et al.

(10) Patent No.: US 11,641,137 B2
(45) Date of Patent: May 2, 2023

(54) MOVABLE MOBILE FURNITURE PANEL FOR WIRELESSLY CHARGING AN EXTERNAL ELECTRONIC DEVICE POSITIONED IN AN ENERGY TRANSFER ZONE

(71) Applicant: WBTEC, LLC, Sarasota, FL (US)

(72) Inventors: Wieslaw Bober, Hopewell Junction, NY (US); Kamil Sienkiel, Wegrzce (PL); Dominik Stanislaw Sienkiel, Ostrowiec Swietokrzyski (PL)

(73) Assignee: WBTEC, LLC, Sarasota, FL (US)

( * ) Notice: Subject to any disclaimer, the term of this patent is extended or adjusted under 35 U.S.C. 154(b) by 0 days.

(21) Appl. No.: 17/850,473

(22) Filed: Jun. 27, 2022

(65) Prior Publication Data
US 2022/0329113 A1 Oct. 13, 2022

Related U.S. Application Data

(63) Continuation-in-part of application No. 16/681,487, filed on Nov. 12, 2019, now Pat. No. 11,374,417.

(60) Provisional application No. 62/758,239, filed on Nov. 9, 2018.

(51) Int. Cl.
| | |
|---|---|
| *H01M 10/46* | (2006.01) |
| *H02J 50/90* | (2016.01) |
| *H02J 50/10* | (2016.01) |
| *H02J 50/00* | (2016.01) |
| *A47B 97/00* | (2006.01) |

(52) U.S. Cl.
CPC ........... *H02J 50/90* (2016.02); *H01M 10/465* (2013.01); *H02J 50/005* (2020.01); *H02J 50/10* (2016.02); *A47B 97/00* (2013.01)

(58) Field of Classification Search
CPC ........ H02J 7/0042; H02J 50/90; H02J 50/005; H02J 50/10; A47B 97/00; H01M 10/465
USPC ........ 320/107, 108, 114, 115, 132, 149, 150
See application file for complete search history.

(56) References Cited

U.S. PATENT DOCUMENTS

| | | |
|---|---|---|
| 2009/0295327 A1 | 12/2009 | McGinley |
| 2017/0136896 A1* | 5/2017 | Ricci ....................... H02J 50/70 |
| 2017/0149181 A1 | 5/2017 | Nelson |
| 2018/0191178 A1 | 7/2018 | Byrne |
| 2019/0305577 A1 | 10/2019 | Yi |

FOREIGN PATENT DOCUMENTS

| | | | | |
|---|---|---|---|---|
| CN | 110212616 A | * | 9/2019 | |
| CN | 110447153 A | * | 11/2019 | ........... A47B 46/005 |
| FR | 3059485 A1 | * | 6/2018 | ............. B60R 16/03 |
| WO | WO-2020247916 A1 | * | 12/2020 | .............. H02J 50/10 |

* cited by examiner

*Primary Examiner* — Edward Tso
(74) *Attorney, Agent, or Firm* — The Farrell Law Firm, P.C.

(57) ABSTRACT

A panel device is provided. The panel device includes an energy transfer zone; at least one coil configured to generate an electromagnetic field for wirelessly charging an external electronic device that is positioned in the energy transfer zone; and an internal drive unit configured to rotate or move the panel device in relation to an exterior object in proximity to the panel device.

19 Claims, 32 Drawing Sheets

MOVABLE MOBILE FURNITURE PANEL FOR WIRELESSLY CHARGING AN EXTERNAL ELECTRONIC DEVICE POSITIONED IN AN ENERGY TRANSFER ZONE

PRIORITY

This application claims priority under 35 U.S.C. § 119 to Polish Patent Application No. 438,513, filed in the Polish Patent Office on Jul. 16, 2021, and is a Continuation in Part Application of U.S. application Ser. No. 16/681,487, filed in the U.S. Patent and Trademark Office on Nov. 12, 2019, which claims priority under 35 U.S.C. § 119 to Provisional Application No. 62/758,239 filed in the U.S. Patent and Trademark Office on Nov. 9, 2018, the entire content of each of which are incorporated herein by reference in their entireties.

BACKGROUND OF THE DISCLOSURE

1. Field of the Disclosure

The present disclosure relates generally to charging electronic devices.

2. Description of the Related Art

Due to the increasing use of electronic devices (i.e., mobile phones, tablets, and personal computers (PCs)), more and more charging locations are needed. Recently, many electronic devices are capable of wired or wireless charging, however, convenient charging locations may not exist.

Users of electronic devices frequently use their electronic devices while sitting on or around furniture (i.e., sofas). Thus, there is a need for charging locations to be situated on or around furniture, and not simply at a desk or table.

Therefore, there is a need to place a charger on or around a piece of furniture that can be characterized by various forms or different sizes. If the user is not interested in obtaining a piece of furniture with a charger built into it, it may be necessary to use a separate device for charging.

Further, wireless charging is increasing in popularity. Wireless charging is beneficial to users due to convenience. Users can place their electronic device in a wireless charging zone to start charging the device without plugging it, as in the case of wall chargers and other traditional charging devices. However, ordinarily a wireless charging induction coil is stationary. Therefore, wireless chargers may be limited since they require the electronic device to be placed in a specific area for charging. Frequently, the charging area is small and a user must be careful when placing the electronic device in the appropriate charging area.

In addition, traditional chargers may be plugged into wall outlets, and the charging locations are limited by the length of the charging cable extending out from the wall outlet.

Thus, there is a need to manufacture more convenient furniture accessories capable of charging electronic devices.

SUMMARY

The present disclosure has been made to address the above-mentioned problems and disadvantages, and to provide at least the advantages described below.

According to an aspect of the disclosure, a panel device includes an energy transfer zone; at least one coil configured to generate an electromagnetic field for wirelessly charging an external electronic device that is positioned in the energy transfer zone; and an internal drive unit configured to rotate or move the panel device in relation to an exterior object in proximity to the panel device.

According to another aspect of the disclosure, a panel device includes a surface including an energy transfer zone; at least one coil configured to generate an electromagnetic field for wirelessly charging an external electronic device that is positioned in the energy transfer zone; an internal drive unit configured to rotate or move the panel device in relation to an exterior object in proximity to the panel device; and a position sensor matrix configured to recognize a position of the external electronic device on the surface of the panel device based on modulation of current drawn by the external electronic device, wherein the panel device is configured to visually display or audibly indicate at least one direction for identifying an optimal charging position for charging the external electronic device based on the recognized position.

BRIEF DESCRIPTION OF THE DRAWINGS

Aspects, features and advantages of the present disclosure will become more apparent from the following detailed description when taken in conjunction with the accompanying drawings in which.

DETAILED DESCRIPTION

Figure 1:
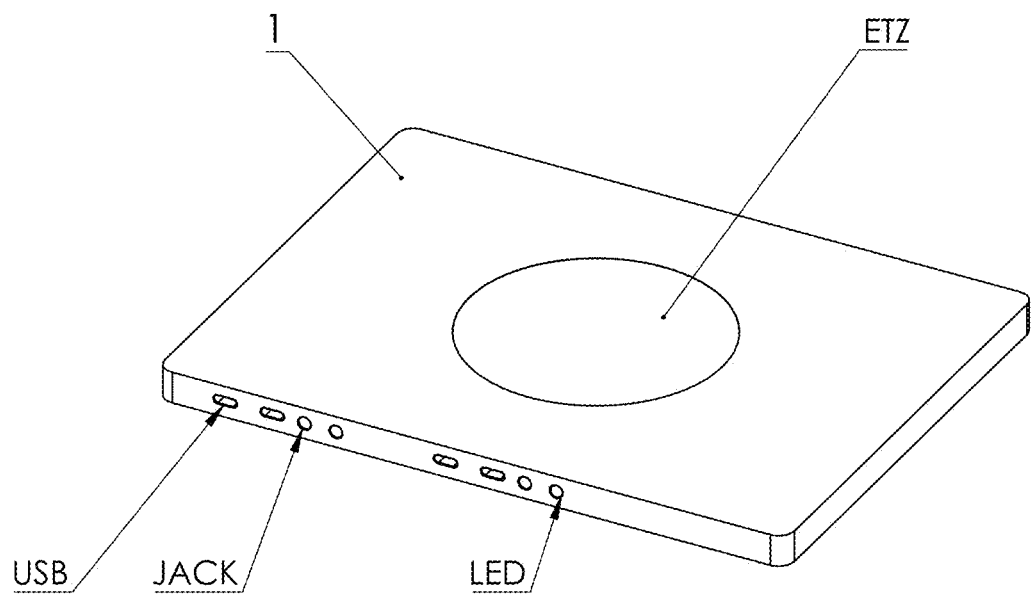
FIG. 1 shows a diagram illustrating a top perspective view of a panel device including a charging zone, an input socket, an output socket, and a power supply, according to an embodiment of the present disclosure.

The present disclosure is directed to providing a charging device for an electronic device and is described in detail with reference to the accompanying drawings. Detailed descriptions of constructions or processes known in the art may be omitted to avoid obscuring the subject matter of the present disclosure.

The descriptions of similar elements are omitted when those elements have already been described with respect to a previous figure.

The present disclosure provides a multi-functional mobile furniture panel (also referred to as a "panel device") intended to be used as a shelf, tabletop, a mobile desktop, or another part of a piece of furniture for wireless charging of portable electronic devices, such as phones, watches, laptops as well as electrical appliances of everyday capable of being charged by an electric current. Wireless charging may be performed using visible light, infrared radiation, radio waves, sound waves, and/or electromagnetic induction.

Further, the present disclosure enables wireless charging of mobile electronic devices and powering of portable electric devices, which at the same time, performs functions of a piece of furniture or a part of furniture, such as a shelf. The device provided by the present disclosure may be placed in a room, vehicle, or on any piece of furniture, with a stable mounting system that provides the possibility for the device to be displaced (moved to somewhere else). In addition, the device may perform functions of a portable or mobile desktop intended to be moved and used both indoors and outdoors.

Thus, the device provided by the present application includes a wireless charging device that may be detachably connected to a portion of a room or vehicle, such as a car, airplane or yacht, and/or to any part of a piece of furniture, while maintaining a rigid and secure connection with the possibility to retract or remove (dismount) the wireless charging device. In addition, the charger may be an intelligent device, with an automatic detection feature of detecting the position of the device to be charged to allow movement of the inductive coil towards the device to be charged.

Accordingly, the device of the present disclosure may include a mobile panel (also referred to as a "panel device") that includes a rigid furniture structural board having two carrying areas for hand grip, manual movement, self-positioning, and mechanical grip by being fixed into a holder with the possibility of being moved in relation to the holder.

The panel device may have a charging module built into the panel device for charging portable electronic devices, such as smartphones, tablets, and laptops, and for powering portable electronic or electrical devices placed at the position of a wireless induction coil, such as lamps, heating mugs, light emitting diode (LED) lights, or other devices that may be convenient for a user to use.

The panel device can be attached to the holder and is configured to move along, at least, one axis from among X, Y, and/or Z axes, and within the plane from a rest position to an optimal charging position. The device including the panel device may be powered by an electrical grid, a battery, a rechargeable battery, or a solar cell.

The electronic device to be charged may include a unit to receive a wireless electrical current charge from a coil, and may be a smartphone, smartwatch or computer. The panel device can also be a display monitor at the same time or may be equipped with a display monitor.

In addition, the panel device can simultaneously provide an electrical current charge and operate as a heating station using radiation energy for heating. Additionally, the panel device can also include a fixed ventilating, humidifying or air-conditioning device.

The panel device can be equipped with a perimeter illumination system that downwardly directs illumination, upwardly directs illumination, downwardly and upwardly directs illumination simultaneously, and/or directs illumination along a periphery, with selectable illumination modes and directions of output light (e.g., via LEDs). The panel device can also be equipped with a motion sensor cooperating with the illumination. For example, the motion sensor may trigger one of the aforementioned illumination settings to occur.

The panel device can be equipped with a sensor for measuring temperature, humidity or other parameters of an environment where the panel device is placed. In addition, the panel device can provide an indicator of a current time, wake-up time or reminder notification (e.g., visually or auditorily).

In addition, it is possible to use a voice, gesture, smartphone app, wireless fidelity (WiFi) or infrared (IR) to control the panel device.

Accordingly, the panel device may be configured to search for an electronic device to be charged located thereon by, at least, one power coil movable within a shelf plane, and the panel device may be provided with a locator that adjusts, for example, by means of two engines, the position of the power coil to the position of the electronic device to be charged, along guides that are perpendicular to each other.

Additionally, the panel device equipped with an internal drive assembly and movable along the X, Y, and Z axes and within a plurality of planes from the rest position to an optimal charging position, is simultaneously rotatable around each axis by angles α, β, and γ, respectively.

The panel device can be lifted and lowered as a hinged tilt element seated in a hinged bracket, rotated around a vertical axis by a desired angle in a swivel bracket, or moved using three axes simultaneously on a bracket.

The charging area can be positioned at any angle between a horizontal and vertical location with respect to the panel device.

That is, the panel device may be fixed on a bracket placed on a rotatable joint that is equipped with a position locking mechanism and fixed to the furniture part clamp. The locking mechanism may include a spring-loaded pin moved by a pusher.

Additionally, the panel device can be in-built into any area of any piece of furniture as a fixed element.

Accordingly, the panel device can be mounted on any support member, in any room, and/or in any vehicle. Any of the angles at which the panel device is positioned can be adjusted individually.

Additionally, the panel device can be a mobile desktop, suitable for both indoors and outdoors. In addition, the panel device can be a movable shelf, a handy table, a bedside table or a part of a table area for work (e.g., a desktop table area).

The panel device may offer many additional functions simultaneously, and may be a universal wireless charging station for any electronic or electrical device equipped with a receiver adapted to receive wireless power (e.g., receive a wireless current) in an inductive charging area.

Additionally, the panel device may be a rigid furniture-related structural board having two carrying areas. One area of the panel device (e.g., a "carrying area") may be for gripping by hand, manual handling and self-positioning, and the other carrying area may be for mechanical gripping by being fixed to a holder and firmly attached to any movable surface.

FIG. 1 shows a diagram illustrating a top perspective view of a panel device including a charging zone, an input socket, an output socket, and a power supply, according to an embodiment of the present disclosure.

Referring to FIG. 1, the panel device 1 includes an energy transfer zone ETZ. The panel device is equipped with a socket for a universal serial bus (USB) connection USB, a socket for a power connection JACK, and at least one LED indicator providing, for example, a battery charge indicator. The USB connection or the power connection JACK may be used to charge a rechargeable battery included in the panel device from a main power supply (e.g., a wall power outlet).

Figure 2:
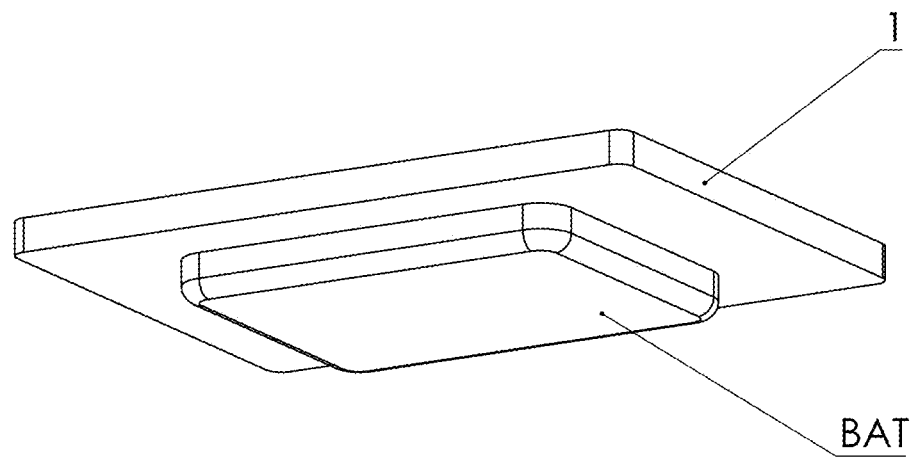
FIG. 2 shows a diagram illustrating a bottom perspective view of a panel device with a battery, according to an embodiment of the present disclosure.

FIG. 2 shows a diagram illustrating a bottom perspective view of a panel device with a battery, according to an embodiment of the present disclosure.

Referring to FIG. 2, a battery BAT is located on a bottom surface of the panel device 1. Alternatively, the battery BAT may be located at other periphery areas of the panel device, or the battery BAT may be located inside the panel device 1. The battery BAT may supply power to the panel device 1.

Figure 3:
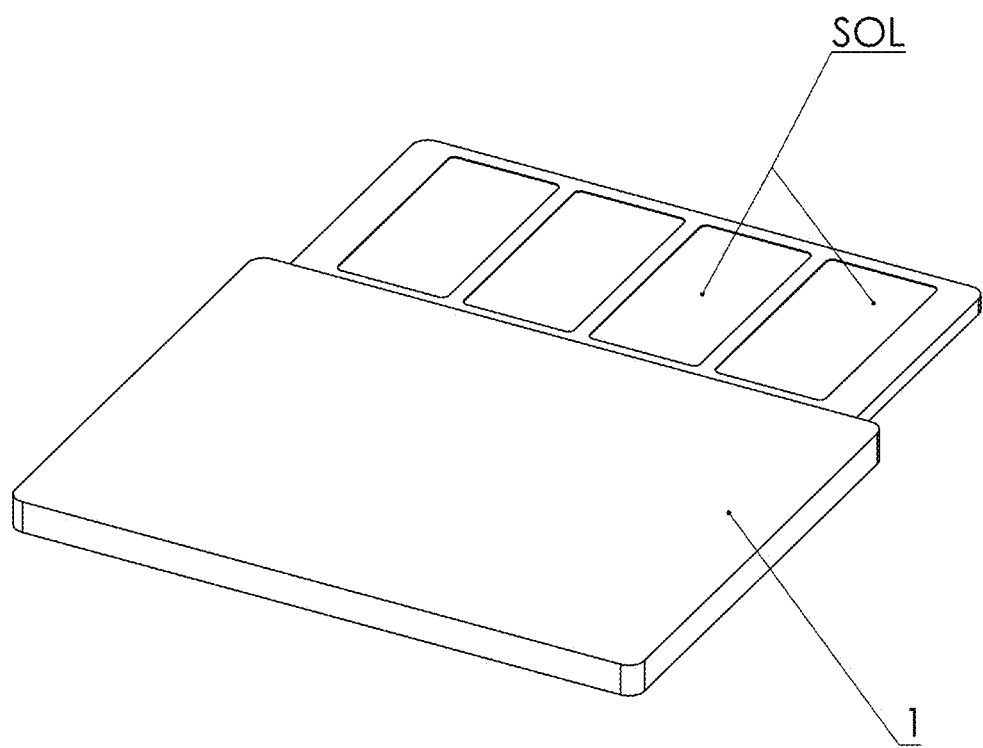
FIG. 3 shows a diagram illustrating a top perspective view of a panel device powered by a solar cell, according to an embodiment of the present disclosure.

FIG. 3 shows a diagram illustrating a top perspective view of a panel device powered by a solar cell, according to an embodiment of the present disclosure.

Referring to FIG. 3, the solar cell SOL may extend outward from a periphery of the panel device 1 and provide power to the panel device 1 by charging a battery. Alternatively, the solar cell SOL may be placed along other areas of the panel device 1. Additionally, the solar cell SOL may retract inwards and/or be foldable.

Figure 4:
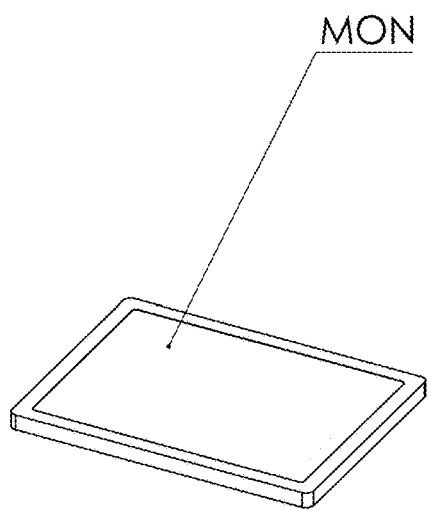
FIG. 4 shows a diagram illustrating a top perspective view of a panel device with a display monitor, according to an embodiment of the present disclosure.

FIG. 4 shows a diagram illustrating a top perspective view of a panel device with a display monitor, according to an embodiment of the present disclosure.

Referring to FIG. 4, the panel device 1 may include a monitor MON on a top surface of the panel device 1. Alternatively, the monitor MON can be built into other surfaces of the panel device 1. In addition, the panel device 1 may include a built-in modem, which when used with the monitor MON, may display media obtained over the Internet.

Figure 5:
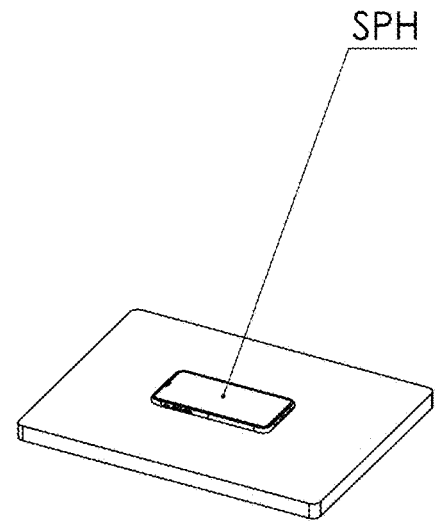
FIG. 5 shows a diagram illustrating a top perspective view of a panel device charging a smartphone, according to an embodiment of the present disclosure.

FIG. 5 shows a diagram illustrating a top perspective view of a panel device charging a smartphone, according to an embodiment of the present disclosure.

Referring to FIG. 5, the panel device 1 may wirelessly charge a smartphone SPH placed on a top surface of the panel device 1.

Figure 6:
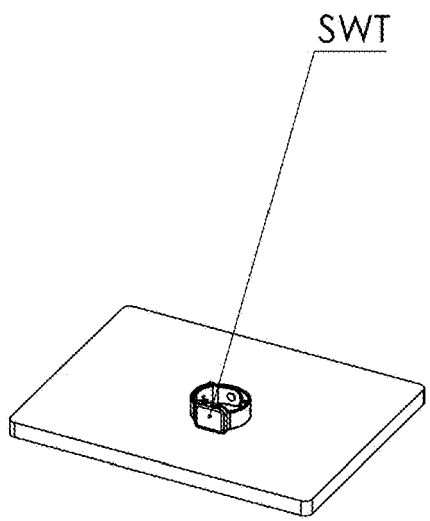
FIG. 6 shows a diagram illustrating a top perspective view of a panel device charging a smartwatch, according to an embodiment of the present disclosure.

FIG. 6 shows a diagram illustrating a top perspective view of a panel device charging a smartwatch, according to an embodiment of the present disclosure.

Referring to FIG. 6, the panel device 1 may wirelessly charge a smartwatch SWT placed on a top surface of the panel device 1.

Figure 7:
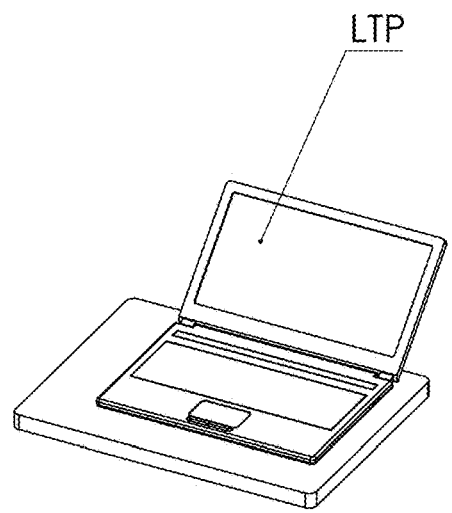
FIG. 7 shows a diagram illustrating a top perspective view of a panel device charging a laptop computer, according to an embodiment of the present disclosure.

FIG. 7 shows a diagram illustrating a top perspective view of a panel device charging a laptop computer, according to an embodiment of the present disclosure.

Referring to FIG. 7, the panel device 1 may wirelessly charge a laptop LTP placed on a top surface of the panel device 1.

Figure 8:
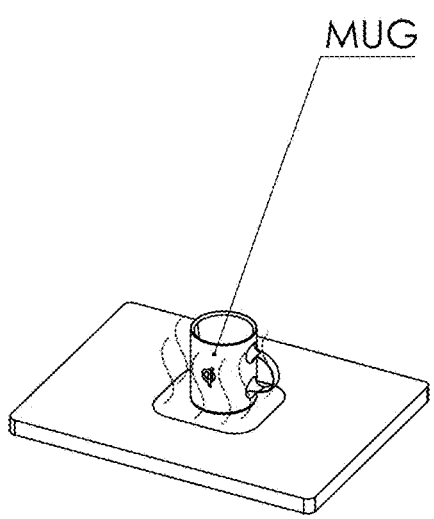
FIG. 8 shows a diagram illustrating a top perspective view of a panel device powering a heating device, according to an embodiment of the present disclosure.

FIG. 8 shows a diagram illustrating a top perspective view of a panel device powering a heating device, according to an embodiment of the present disclosure.

Referring to FIG. 8, the panel device 1 may wirelessly provide power to a heating station to heat a mug that is placed on a top surface of the panel device 1.

Figure 9:
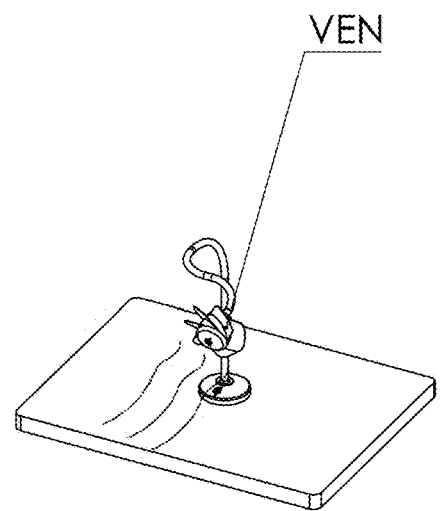
FIG. 9 shows a diagram illustrating a top perspective view of a panel device powering an air conditioning device, according to an embodiment of the present disclosure.

FIG. 9 shows a diagram illustrating a top perspective view of a panel device powering an air conditioning device, according to an embodiment of the present disclosure.

Referring to FIG. 9, the panel device 1 may wirelessly provide power to an air conditioning device VEN that is placed on a top surface of the panel device 1.

Figure 10:
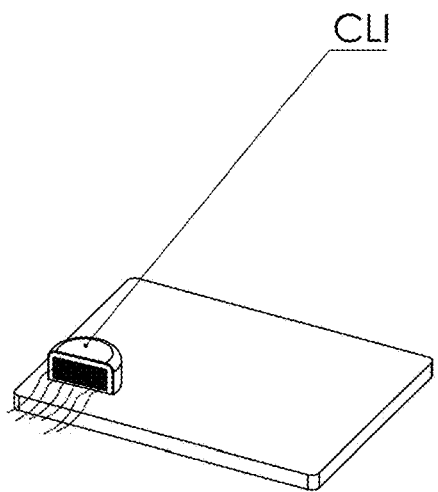
FIG. 10 shows a diagram illustrating a top perspective view of a panel device charging a climate control device, according to an embodiment of the present disclosure.

FIG. 10 shows a diagram illustrating a top perspective view of a panel device charging a climate control device, according to an embodiment of the present disclosure.

Referring to FIG. 10, the panel device 1 may wirelessly provide power to a climate control device CLI that is placed on a top surface of the panel device 1. The climate control device CLI may provide hot or cold air, may filter air, or may humidify air.

Figure 11:
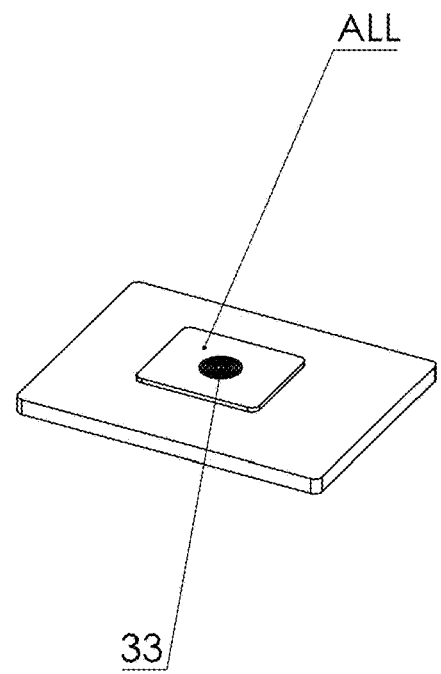
FIG. 11 shows a diagram illustrating a top perspective view of a panel device charging an inductively powered appliance, according to an embodiment of the present disclosure.

FIG. 11 shows a diagram illustrating a top perspective view of a panel device charging an inductively powered appliance, according to an embodiment of the present disclosure.

Referring to FIG. 11, the inductively powered appliance ALL may be placed on or around a charging coil 33 located within the panel device 1. Once in place, the inductively powered appliance ALL may receive power. The inductively powered appliance may be any appliance capable of receiving power from the panel device 1.

Figure 12:
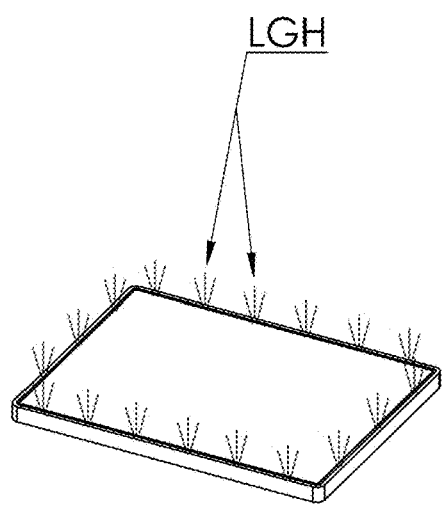
FIG. 12 shows a diagram illustrating a top perspective view of a panel device including perimeter illumination, according to an embodiment of the present disclosure.

FIG. 12 shows a diagram illustrating a top perspective view of a panel device including perimeter illumination, according to an embodiment of the present disclosure.

Referring to FIG. 12, the panel device 1 includes a perimeter backlight LGH along edges of the panel device 1 that upwardly projects light.

Figure 13:
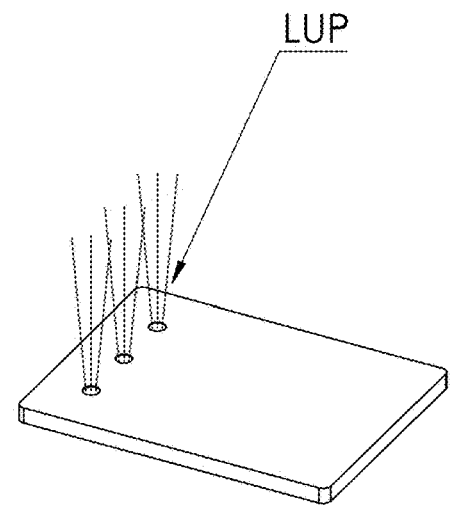
FIG. 13 shows a diagram illustrating a top perspective view of a panel device including illumination directed in an upward direction, according to an embodiment of the present disclosure.

FIG. 13 shows a diagram illustrating a top perspective view of a panel device including illumination directed in an upward direction, according to an embodiment of the present disclosure.

Referring to FIG. 13, the panel device 1 includes a backlight LUP positioned on one side of the top surface of the panel device 1 that upwardly projects light.

Figure 14:
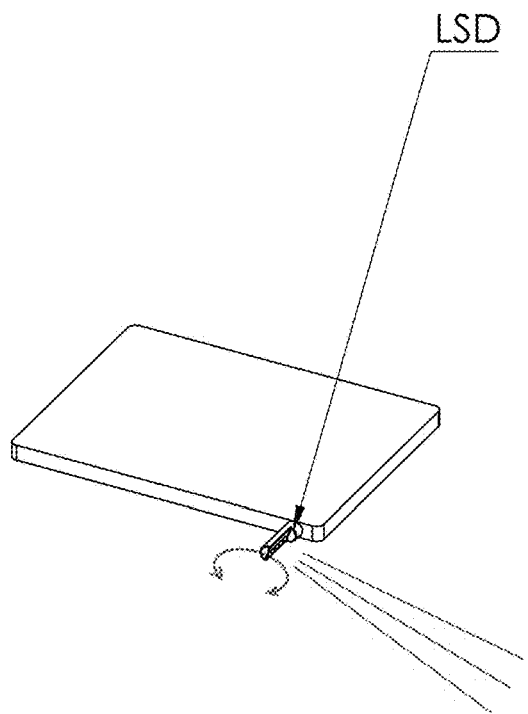
FIG. 14 shows a diagram illustrating a top perspective view of a panel device including illumination outwardly rotatable from a side of the panel device, according to an embodiment of the present disclosure.

FIG. 14 shows a diagram illustrating a top perspective view of a panel device including illumination outwardly rotatable from a side of the panel device, according to an embodiment of the present disclosure.

Referring to FIG. 14, the panel device 1 includes a backlight LSD extending from a side of the panel device 1 and is rotatable with respect to a surface of the panel device 1.

Figure 15:
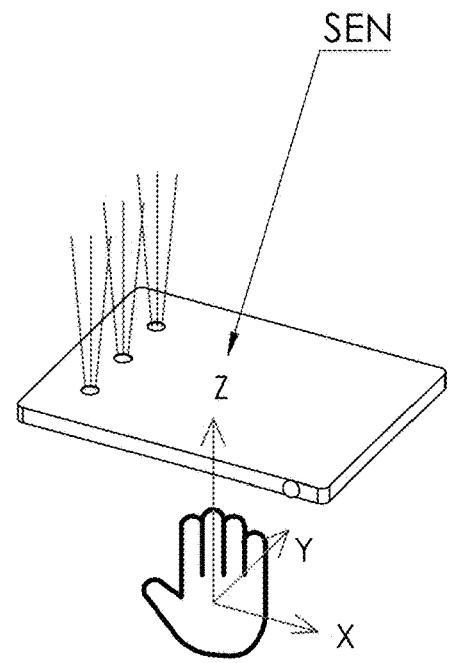
FIG. 15 shows a diagram illustrating a top perspective view of a panel device including multiple illumination modes with a motion detector, according to an embodiment of the present disclosure.

FIG. 15 shows a diagram illustrating a top perspective view of a panel device including multiple illumination modes with a motion detector, according to an embodiment of the present disclosure.

Referring to FIG. 15, the panel device 1 is equipped with a motion sensor SEN capable of being used to activate an illumination state of the panel device 1. For example, an illumination mode of the panel device may be in an inactive state (e.g., a sleep state), but may be switched to an active state when motion is detected.

Figure 16:
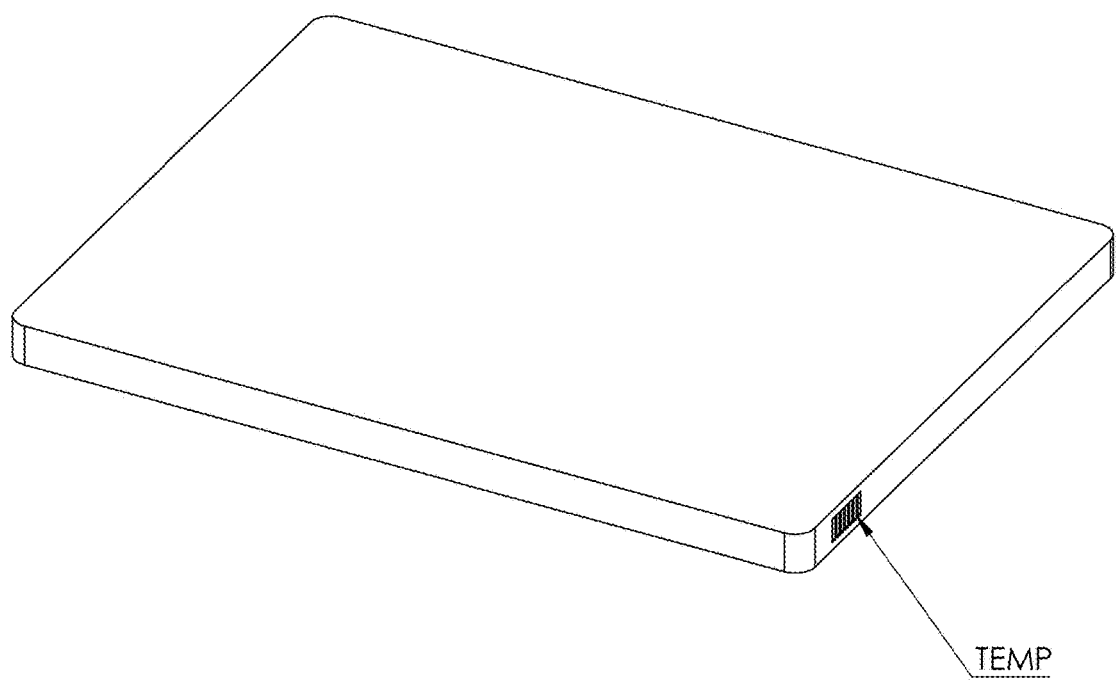
FIG. 16 shows a diagram illustrating a top perspective view of a panel device with a temperature sensor, according to an embodiment of the present disclosure.

FIG. 16 shows a diagram illustrating a top perspective view of a panel device with a temperature sensor, according to an embodiment of the present disclosure.

Referring to FIG. 16, the panel device 1 includes a temperature sensor TEMP that may be used to sense temperature, humidity, or other environmental parameters.

Figure 17:
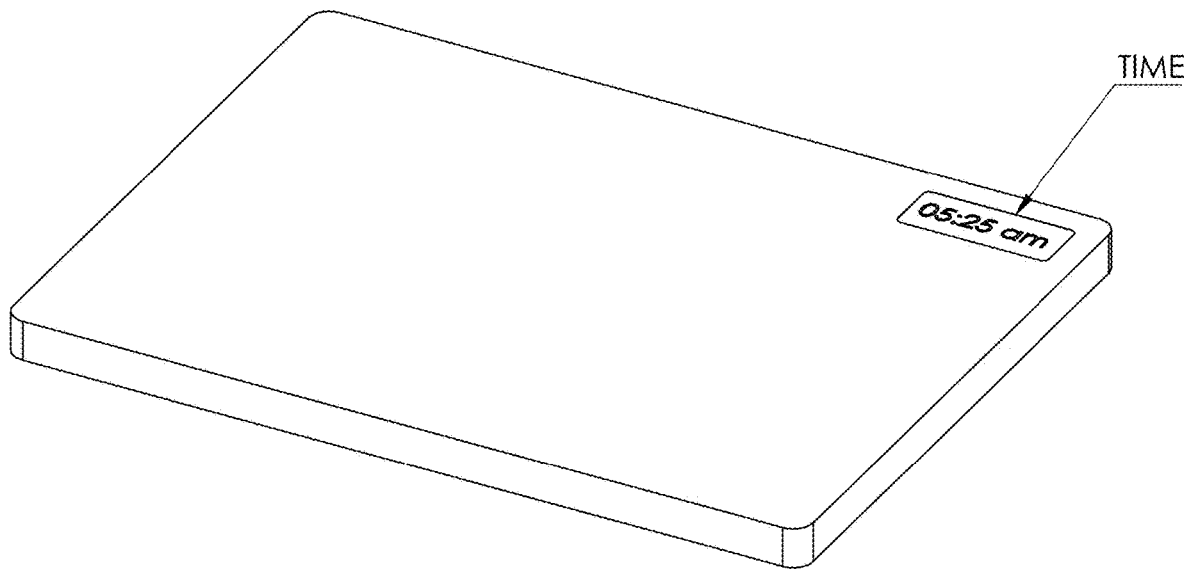
FIG. 17 shows a diagram illustrating a top perspective view of a panel device including a time indicator, according to an embodiment of the present disclosure.

FIG. 17 shows a diagram illustrating a top perspective view of a panel device including a time indicator, according to an embodiment of the present disclosure.

Referring to FIG. 17, the panel device 1 includes a timer indicator TIME that is capable of displaying a time and providing other clock-like functions (e.g., alarm or timer functions).

Figure 18:
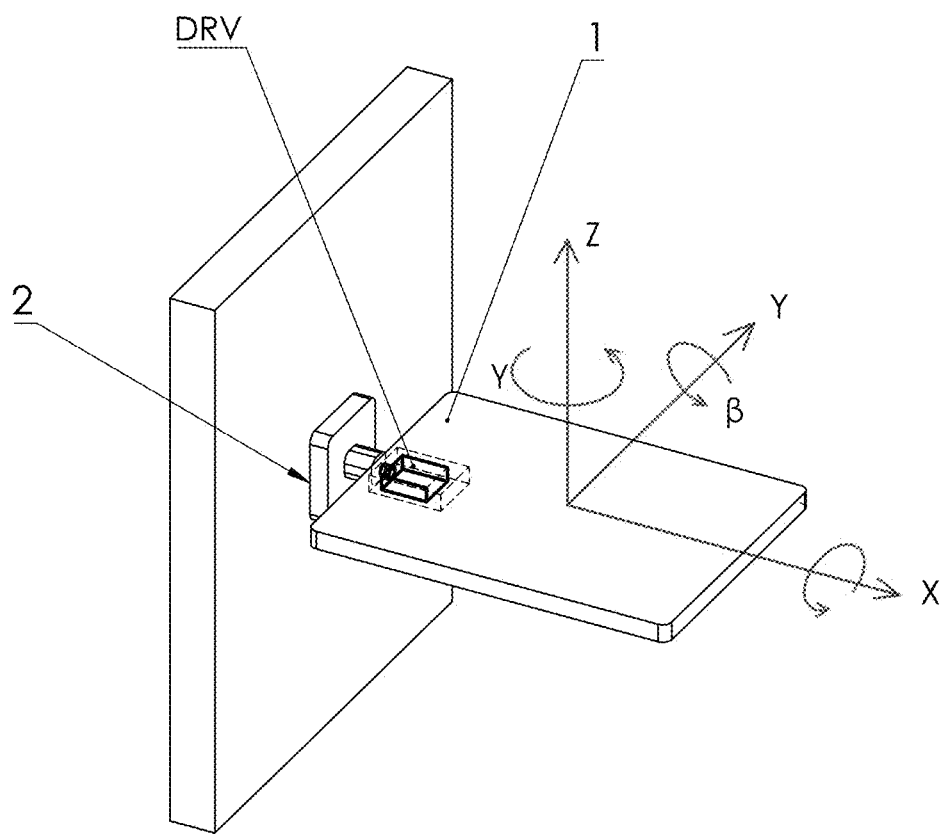
FIG. 18 shows a diagram illustrating a top perspective view of a panel device mounted to a handle with an internal drive assembly, according to an embodiment of the present disclosure.

FIG. 18 shows a diagram illustrating a top perspective view of a panel device mounted to a handle (e.g., a mounting bracket) with an internal drive assembly, according to an embodiment of the present disclosure.

Referring to FIG. 18, the panel device 1 is provided with an internal drive unit DRV. In such a case, the panel device 1 may be attached to the holder and configured to move in the direction of, at least, one axis among the X, Y, and Z axes and, at least, from a rest position (e.g., a vertical folded-down position) to an optimal charging position (e.g., a horizontal foldout-out position). In addition, the panel device 1 may be rotated around the X, Y, and Z axes along angles $\alpha$, $\beta$, and $\gamma$, respectively.

Figure 19:
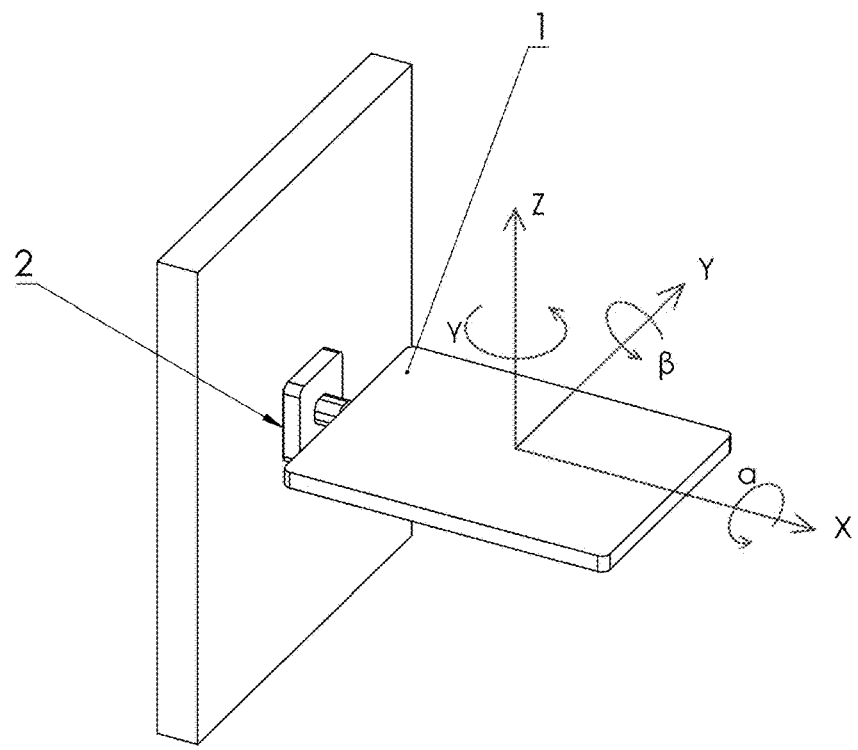
FIG. 19 shows a diagram illustrating a top perspective view of a panel device mounted to a handle movable along X, Y, and Z axes, according to an embodiment of the present disclosure.
Figure 20:
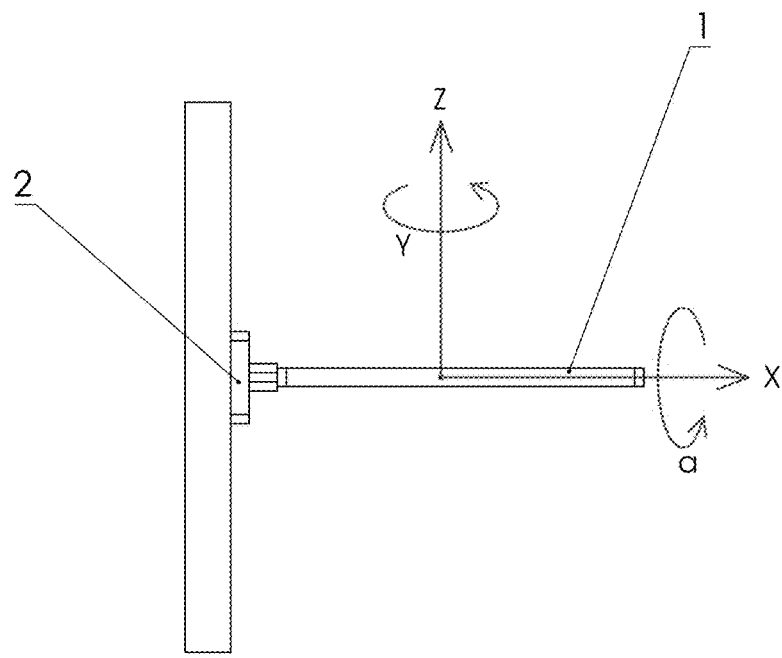
FIG. 20 shows a diagram illustrating a profile view of a panel device mounted to a handle movable along X, Y, and Z axes showing angles or rotations α, β, and γ, respectively, according to an embodiment of the present disclosure.

FIG. 19 shows a diagram illustrating a top perspective view of a panel device mounted to a handle movable along X, Y, and Z axes, according to an embodiment of the present disclosure. FIG. 20 shows a diagram illustrating a profile view of a panel device mounted to a handle movable along X, Y, and Z axes showing angles or rotations $\alpha$, $\beta$, and $\gamma$, respectively, according to an embodiment of the present disclosure.

Referring to FIGS. 19-20, additional views of the panel device 1 showing various movements are provided. For example, the panel device can be moved by a singular displacement along one of the axes X, Y, and Z, and/or by one or more movements including consecutive displacements along one or more axes X, Y, and Z. In addition, simultaneous rotation around each of the axes X, Y, and Z by the angle $\alpha$, $\beta$, and $\gamma$, respectively, is also possible.

The panel device can be controlled using a voice control system, gestures, via a smartphone app, using a wireless fidelity (WiFi) network, or using an infrared (IR) wireless connection.

Figure 21:
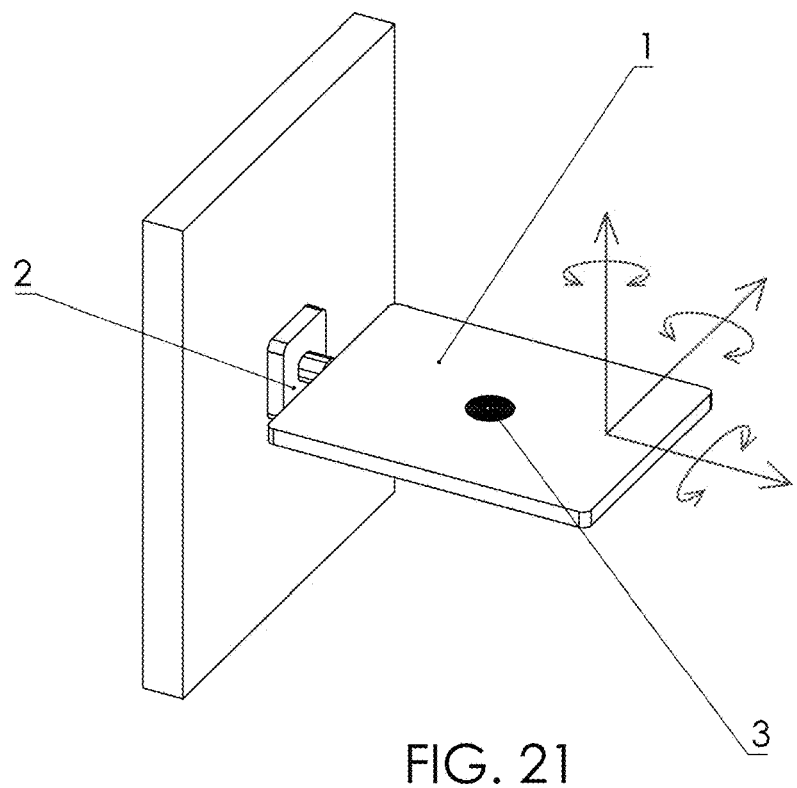
FIG. 21 shows a diagram illustrating a top perspective view of a panel device mounted to a handle with a charging/energy transfer zone, according to an embodiment of the present disclosure.

FIG. 21 shows a diagram illustrating a top perspective view of a panel device mounted to a handle with a charging/energy transfer zone, according to an embodiment of the present disclosure.

Referring to FIG. 21, an inductive charging coil 3 is located in the panel device 1. The surface of the panel device 1 nearest to the charging coil may be a preferred charging area. In addition, the coil 3 may be connected to an electric power source.

Figure 22:
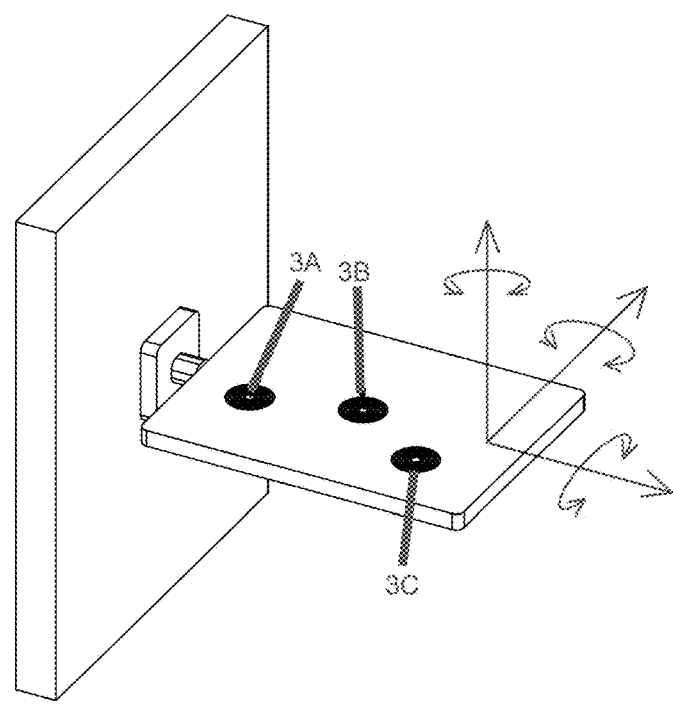
FIG. 22 shows a diagram illustrating a top perspective view of a panel device mounted to a handle with multiple stationary charging/energy transfer zones, according to an embodiment of the present disclosure.

FIG. 22 shows a diagram illustrating a top perspective view of a panel device mounted to a handle with multiple stationary charging/energy transfer zones, according to an embodiment of the present disclosure.

Referring to FIG. 22, several induction coils 3A, 3B, and 3C are arranged in the panel device 1, so as to increase the area of the inductive energy transfer zone ETZ for charging electronic devices located at or on the panel device 1.

Figure 23:
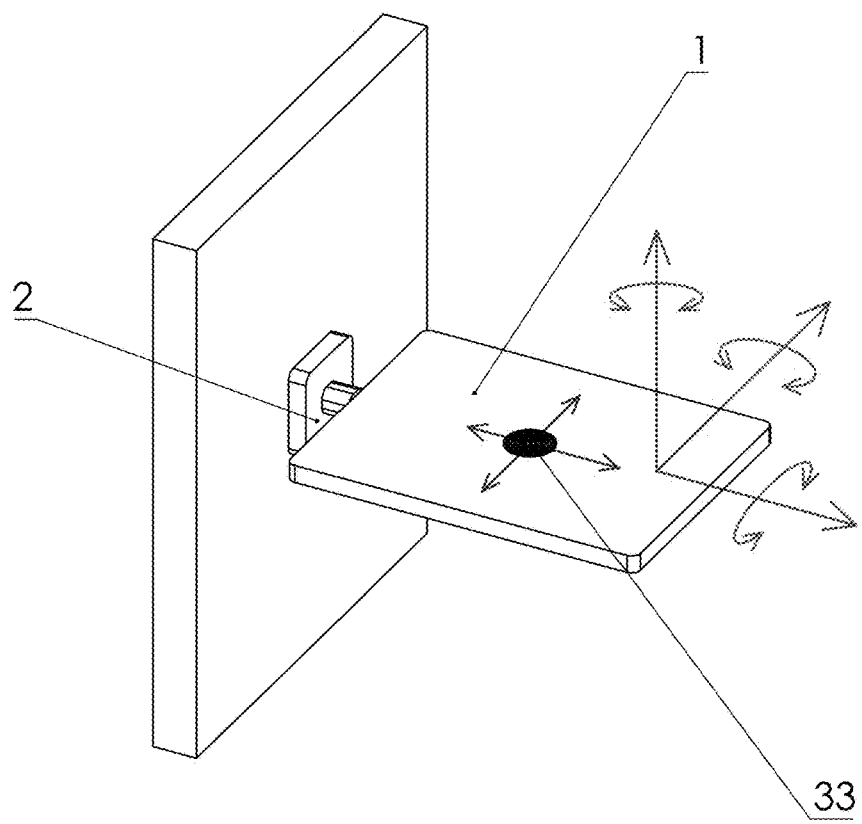
FIG. 23 shows a diagram illustrating a top perspective view of a panel device mounted to a handle with a movable charging/energy transfer zone, according to an embodiment of the present disclosure.

FIG. 23 shows a diagram illustrating a top perspective view of a panel device mounted to a handle with a movable charging/energy transfer zone, according to an embodiment of the present disclosure.

Referring to FIG. 23, a movable inductive coil 33 is located inside the panel device 1. The movable inductive coil 33 is movable along multiple axes of the panel device 1, and may be used to locate a device to be charged and move towards it from inside the panel device 1.

In order to reach a charging area where the induction process takes place, the induction coil 33 may be moved, and the device to be charged can remain stationary.

Figure 24:
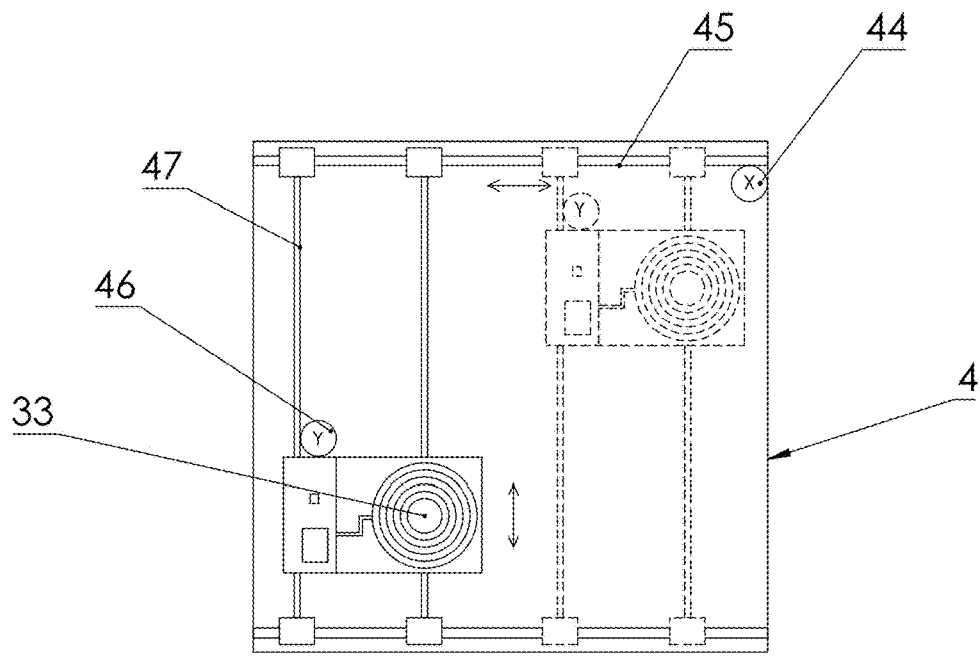
FIG. 24 shows a diagram illustrating a top view of a mobile coil module capable of locating an electronic device to be charged, according to an embodiment of the present disclosure.

FIG. 24 shows a diagram illustrating a top view of a mobile coil module capable of locating an electronic device to be charged, according to an embodiment of the present disclosure.

Referring to FIG. 24, the mechanism for enabling the coil 33 to be moved includes a base 4 with a first motor 44 and a wireless charging coil 33.

In addition, the base 4 may include the second motor 46 configured to move the coil base unit 33 from a first position to a second position, along a first guide 47, perpendicular to a second guide 45. The second motor 46 may be attached to a base unit 33 of the coil or may be positioned somewhere else within the base 4 without being attached to the base unit of the coil 33. Additionally, the first motor 44 may be configured to move the base unit of the coil 33 in a first direction, and the second motor 46 may be configured to move the base unit of the coil 33 in a second direction, perpendicular to the first direction.

In addition, a power stage controller connected to the wireless charging coil may be configured to determine frequency characteristics of the wireless charging coil 33 and to control the power stage driver to provide a specific current to the wireless charging coil 33 based on the frequency characteristics of the coil and an input power value.

Thus, an electronic device may be intelligently searched for and located on the panel device 1 for charging. Accordingly, the induction coil 33 may be moved to redefine a charging zone to be moved to be near a device to be charged.

Figure 25:
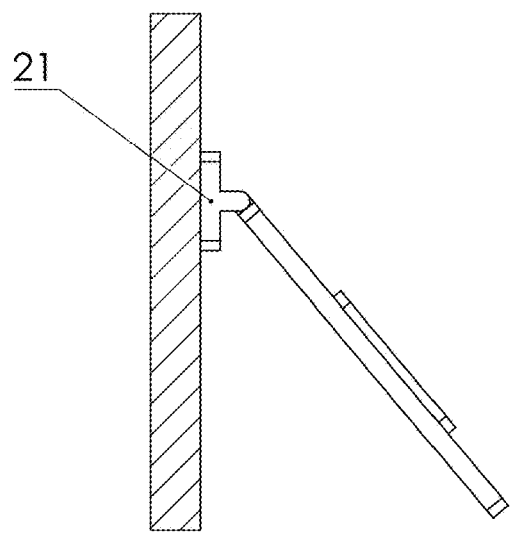
FIG. 25 shows a diagram illustrating a top perspective view of a panel device attached to a handle as a hinged shelf in a folded position, according to an embodiment of the present disclosure.

FIG. 25 shows a diagram illustrating a top perspective view of a panel device attached to a handle as a hinged shelf in a folded position, according to an embodiment of the present disclosure.

Referring to FIG. 25, the panel device 1 may be raised and lowered via a hinge swivel member mounted on a hinge mount 21, with the charging area located at any angle between a horizontal or vertical position.

Figure 26:
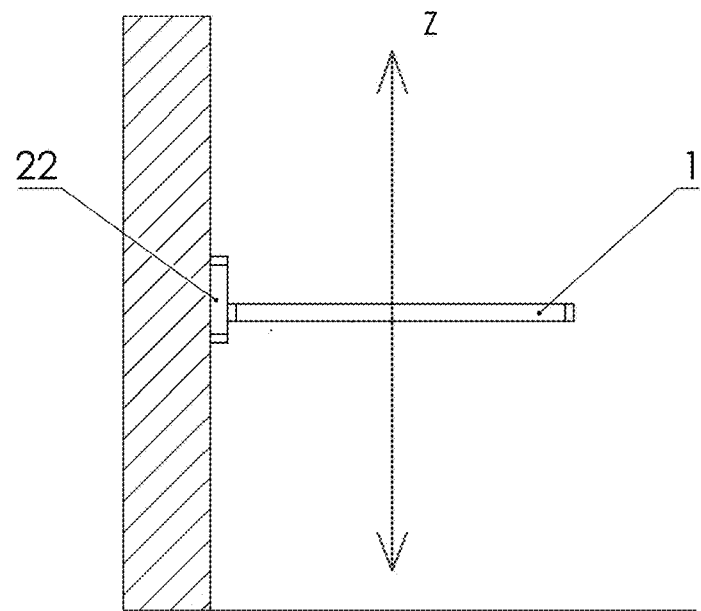
FIG. 26 shows a diagram illustrating a top perspective view of a panel device attached to a handle mount as a vertically movable shelf, according to an embodiment of the present disclosure.

FIG. 26 shows a diagram illustrating a top perspective view of a panel device attached to a handle mount as a vertically movable shelf, according to an embodiment of the present disclosure.

Referring to FIG. 26, the panel device 1 may be raised and lowered vertically along a guide mount 22.

Figure 27:
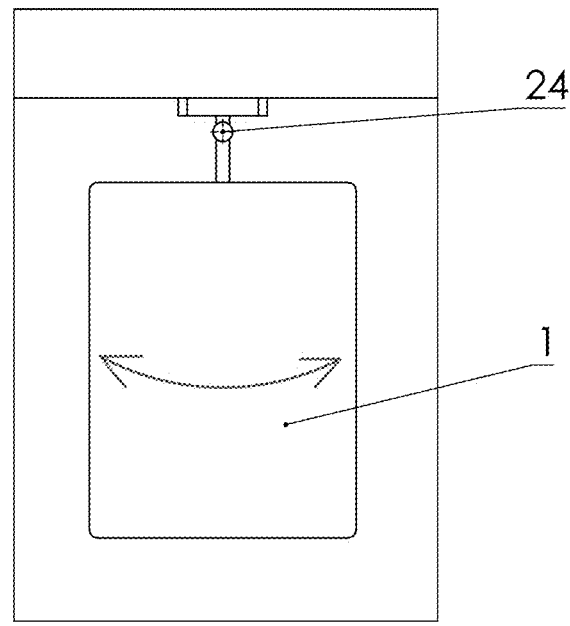
FIG. 27 shows a diagram illustrating a top view of a panel device attached to a rotatable swivel handle, according to an embodiment of the present disclosure.

FIG. 27 shows a diagram illustrating a top view of a panel device attached to a rotatable swivel handle, according to an embodiment of the present disclosure.

Referring to FIG. 27, the panel device 1 may be angularly rotated about an axis that extends outward from the swivel mount 24 and passes through a center of the panel device 1.

Figure 28:
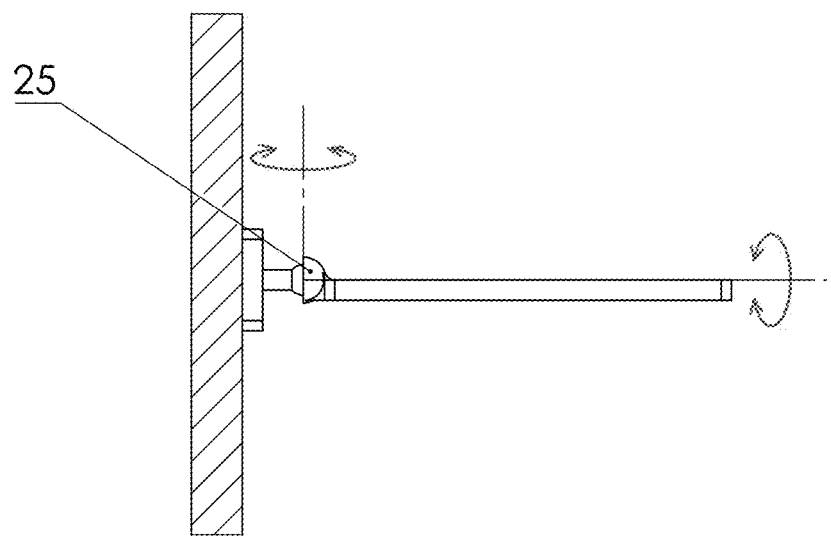
FIG. 28 shows a diagram illustrating a top perspective view of a panel device attached to a rotatable swivel handle showing two axes of rotation, according to an embodiment of the present disclosure.

FIG. 28 shows a diagram illustrating a top perspective view of a panel device attached to a rotatable swivel handle showing two axes of rotation, according to an embodiment of the present disclosure.

Referring to FIG. 28, the panel device 1 is attached to an articulating mount 25 that may allow the panel device 1 to rotate about a vertical angular axis and a horizontal angular axis, as illustrated by the orientation of the panel device 1 in FIG. 28. In addition, the articulating mount 25 may allow the panel device 1 to rotate about a third angular axis perpendicular to the aforementioned vertical and horizontal axes (as shown in FIG. 23).

Figure 29:
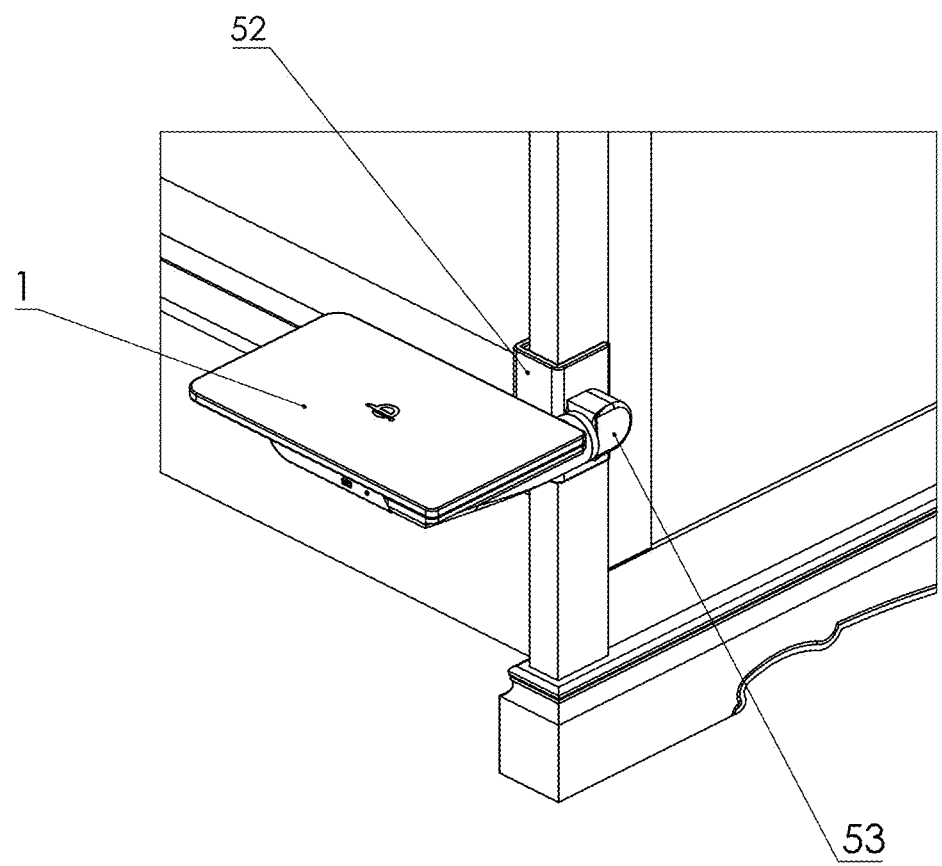
FIG. 29 shows a diagram illustrating a top perspective view of a panel device attached to a furniture clamp, according to an embodiment of the present disclosure.

FIG. 29 shows a diagram illustrating a top perspective view of a panel device attached to a furniture clamp, according to an embodiment of the present disclosure.

Referring to FIG. 29, panel device 1 is designed to be fixed to a piece of furniture by means of a clamp 52. With respect to the clamp 52, the pivotable joint 53 is fixed and includes a position locking mechanism to grasp the piece of furniture.

Figure 30:
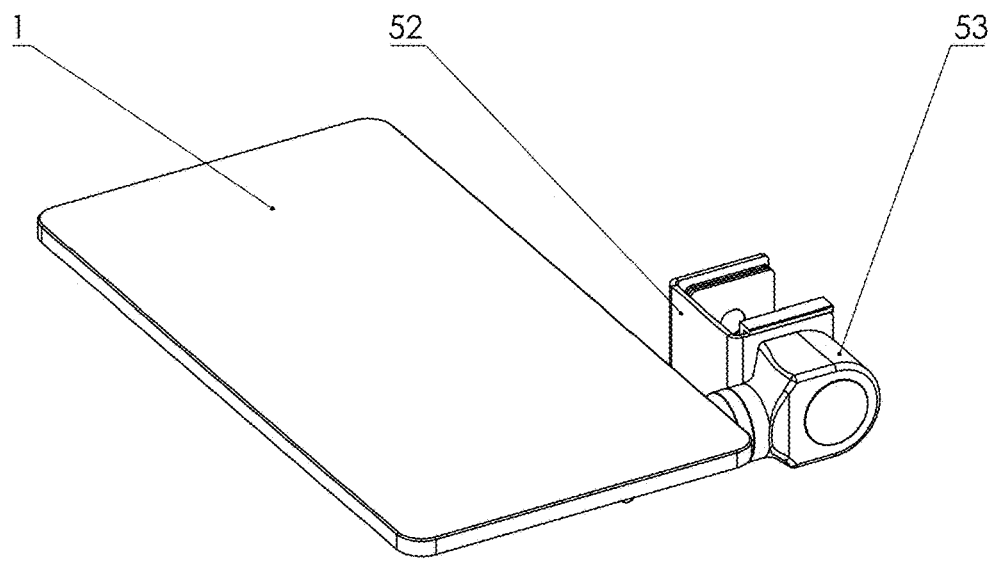
FIG. 30 shows a diagram illustrating a top perspective view of a panel device connected to a furniture clamp, according to an embodiment of the present disclosure.

FIG. 30 shows a diagram illustrating a top perspective view of a panel device connected to a furniture clamp, according to an embodiment of the present disclosure.

Referring to FIG. 30, the panel device 1 is shown with the clamp 52 and the pivotable joint 53 without the piece of furniture being present.

Figure 31:
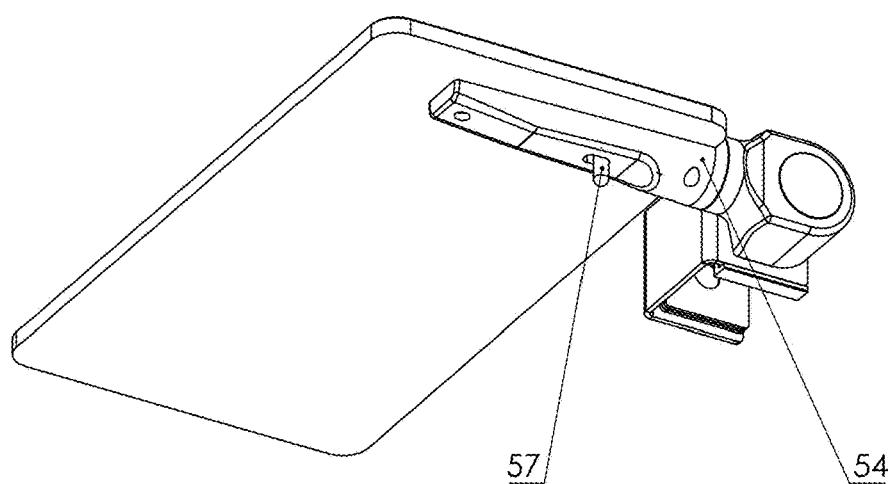
FIG. 31 shows a diagram illustrating a bottom perspective view of a panel device connected to a furniture clamp, according to an embodiment of the present disclosure.
Figure 32:
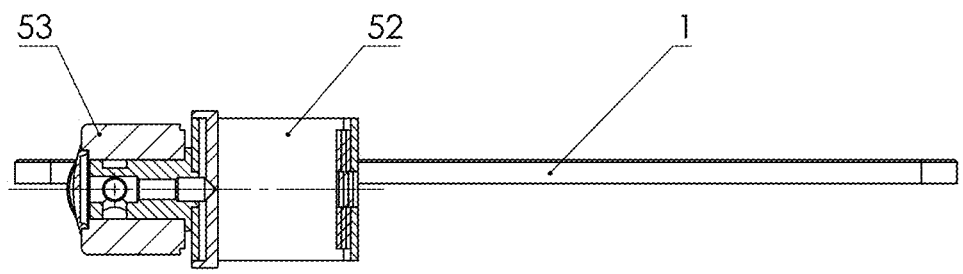
FIG. 32 shows a diagram illustrating a cross sectional side view of a panel device locking mechanism, according to an embodiment of the present disclosure.
Figure 33:
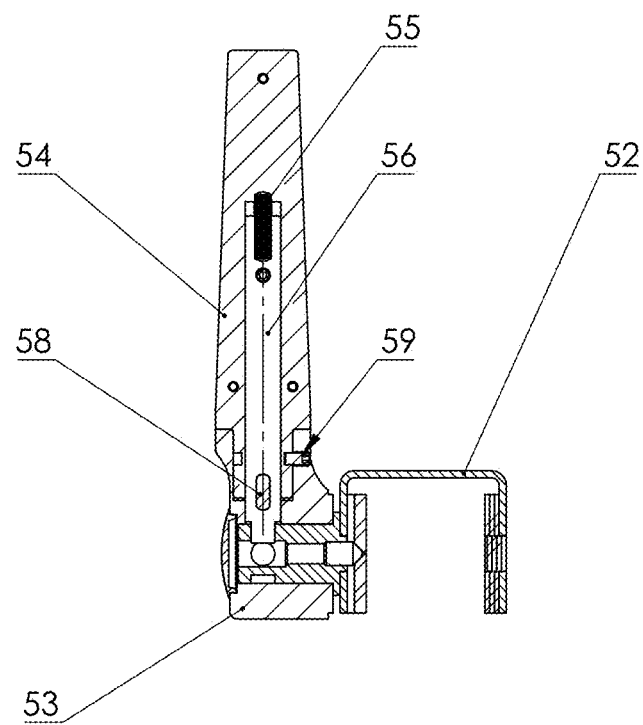
FIG. 33 shows a diagram illustrating a cross sectional top view of a panel device locking mechanism, according to an embodiment of the present disclosure.

FIG. 31 shows a diagram illustrating a bottom perspective view of a panel device connected to a furniture clamp, according to an embodiment of the present disclosure. FIG. 32 shows a diagram illustrating a cross sectional side view of a panel device locking mechanism, according to an embodiment of the present disclosure. FIG. 33 shows a diagram illustrating a cross sectional top view of a panel device locking mechanism, according to an embodiment of the present disclosure.

Referring to FIG. 31, a bottom side of the panel device 1 is shown, displaying a handle 54 with a pusher 57 of an arm that attaches the panel device 1 to the aforementioned clamp 52 and pivotable joint 53. Referring to FIG. 32, a cross sectional side view of the panel device 1 is shown, displaying the arm in relation to the clamp 52 and pivotable joint 53. Referring to FIG. 33, a cross sectional top view of the panel device 1 is shown, which displays the spatial orientation of the clamp 52, pivotable joint 53, handle 54, spring press 55, locking pin 56, pusher 57, keyway 58, and screw 59, in relation to each other.

Referring to FIGS. 31-33, the clamp 52 is fixed to the pivotable joint 53. A spring-pressed 55 locking pin 56 moved by a pusher 57 is included in the handle 54 of the panel device 1. Pulling the pusher 57 may cause a plunger to move in relation to a pivot mechanism, thereby causing the keyway 58 to slide out of preset grooves from a first position to a second position. Once in the second position, the panel may be detached from the handle 54, thereby detaching the panel from the pivotable joint 53 and the clamp 52, allowing the panel device 1 to move freely without being limited to the angles and directions of rotations present when the keyway 58 is in the first position. The handle 54 is fixed to the pivotable joint 53 and may be protected via the screw 59.

Figure 34:
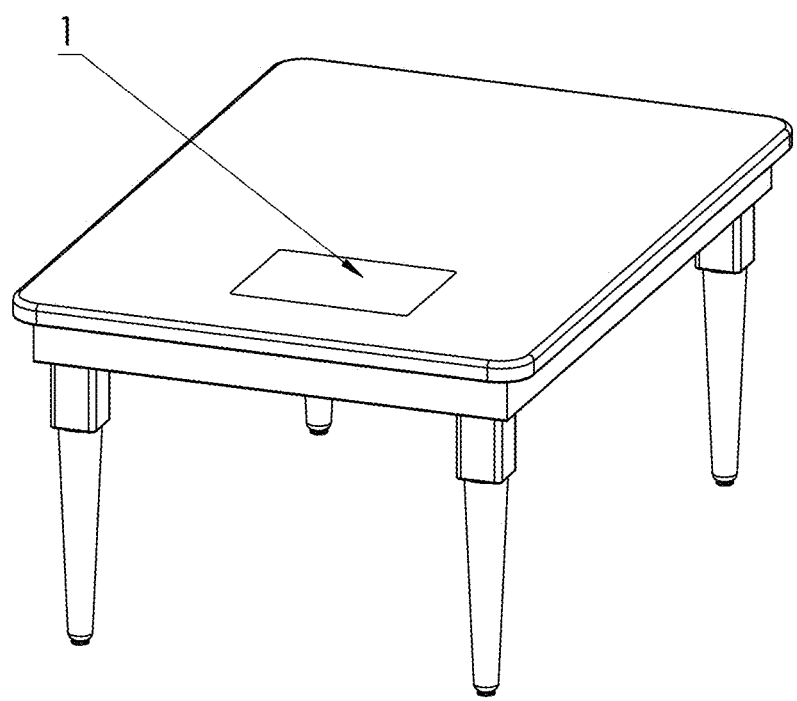
FIG. 34 shows a diagram illustrating a top perspective view of a panel device positioned in a table top, according to an embodiment of the present disclosure.

FIG. 34 shows a diagram illustrating a top perspective view of a panel device positioned in a table top, according to an embodiment of the present disclosure.

Figure 35:
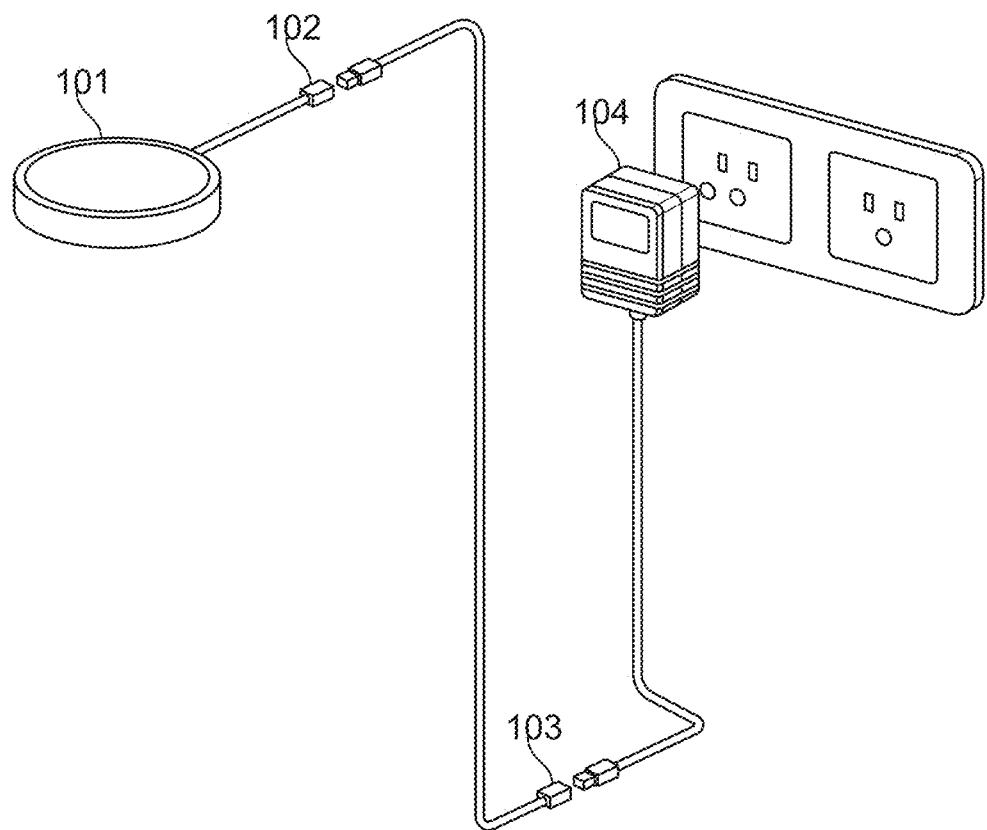
FIG. 35 shows a diagram illustrating a configuration of a wireless charger, according to an embodiment of the present disclosure.

FIG. 35 is a diagram illustrating a configuration of a wireless charger, according to an embodiment of the present disclosure.

The wireless charger of FIG. 35 includes a charging pad 101. The charging pad 101 may include a coil capable of producing an electromagnetic field that extends outward from the charging pad 101. The coil may be embedded inside the charging pad 101 so that an electronic device can be placed in an electromagnetic field by being placed on top of or near a surface of the charging pad 101. The charging pad 101 may be attached to a first cable (i.e., wire) which connects to a first electrical connector 102.

The first electrical connector 102 is connected to a second cable which is connected to a second electrical connector 103. The second electrical connector 103 is connected to a third cable which connects to the wall power supply 104. The first electrical connector 102 and the second electrical connector 103 are detachable such that each may be used to connect or disconnect the charging pad 101 from the wall power supply 104.

The wall power supply 104 may connect to a standard United States power supply of 120 volts (V) at 60 hertz (Hz), or may be connected to other power supply voltages and/or frequencies (i.e., alternating current and/or direct current power).

The first electrical connector 102 and the second electrical connector 103 are detachable, therefore the charging pad 101 may be detached from the second cable, the third cable, and the wall power supply 104. Likewise, the wall power supply 104 may be detached from the second cable, the first cable, and the wireless charger.

An electrical connector may be any device capable of forming an electrical connection among two or more electronic circuits. That is, when an electrical connector is in a disconnected state, the two or more electronic circuits may not be electronically coupled to each other. When an electrical connector is in a connected state, the two or more electronic circuits may be electronically coupled to each other.

Figure 36:
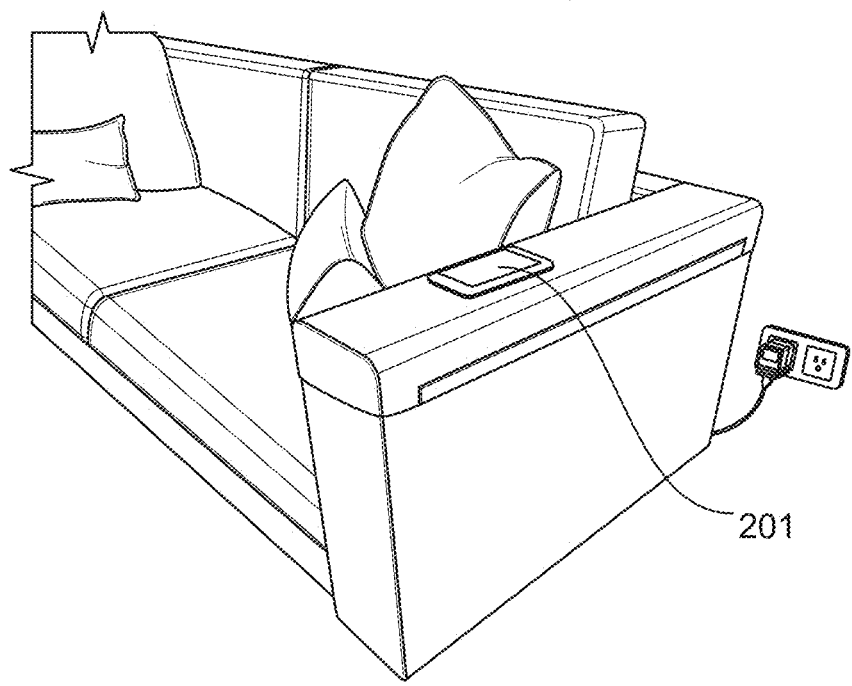
FIG. 36 shows a diagram illustrating a sofa armrest with a wireless charger embedded therein, according to an embodiment of the present disclosure.

FIG. 36 shows a diagram illustrating a sofa armrest with a wireless charger embedded therein, according to an embodiment of the present disclosure.

Referring to FIG. 36, the wireless charger is embedded into the armrest of the sofa such that an electronic device 201 may be wirelessly charged by being placed on top of the armrest near the embedded wireless charger.

By embedding the wireless charger inside of the armrest of the sofa, many of the wires of the wireless charger are hidden from view such that the charging configuration is aesthetically pleasing.

Figure 37:
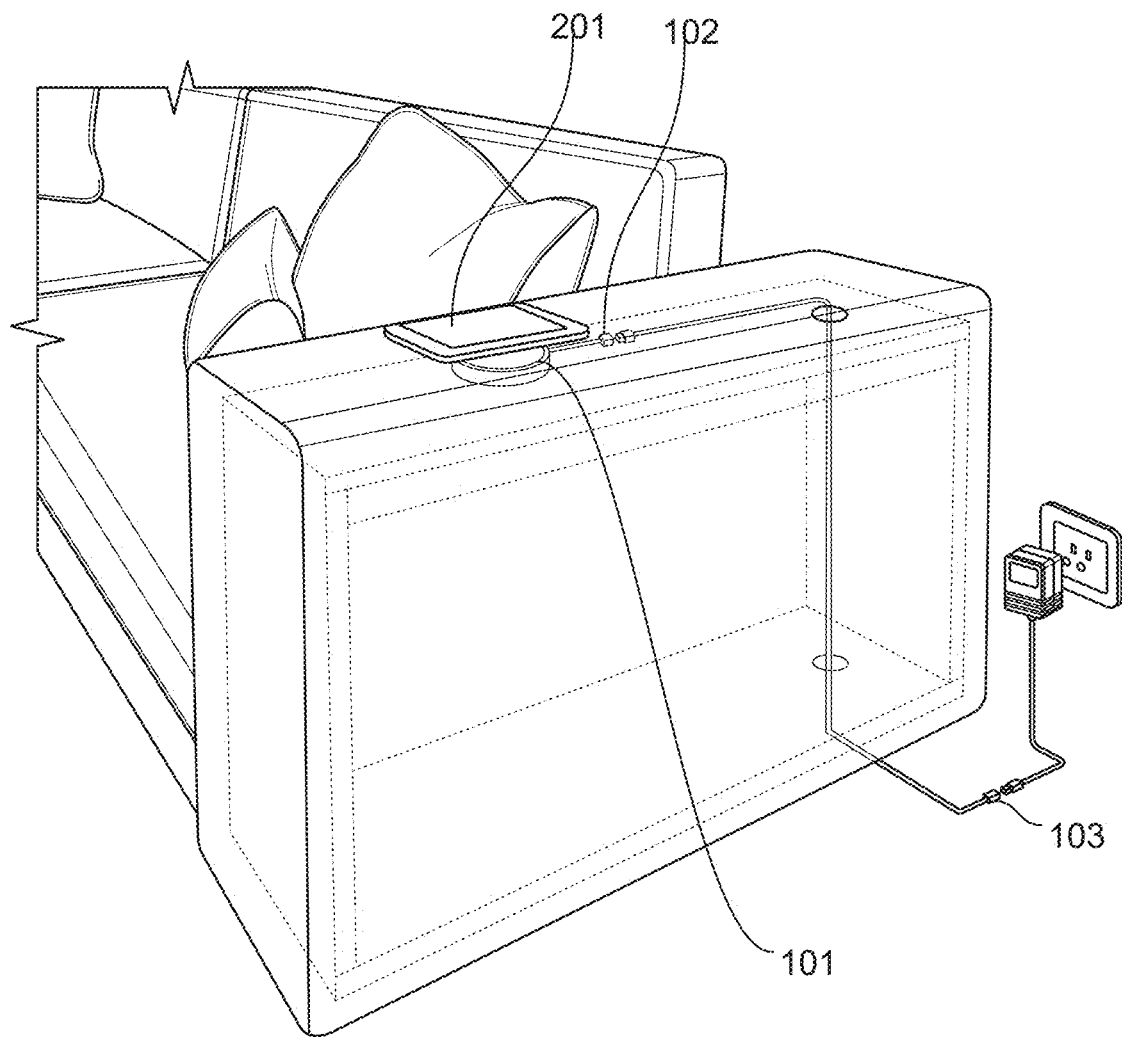
FIG. 37 shows a diagram illustrating a transparent view of a configuration of a wireless charger embedded in a sofa armrest, according to an embodiment of the present disclosure.

FIG. 37 shows a diagram illustrating a transparent view of a configuration of a wireless charger embedded in a sofa armrest, according to an embodiment of the present disclosure.

In particular, the positioning of the charging pad 101, the first electrical connector 102, and the second electrical connector 103 within the armrest is revealed by the transparent armrest.

The charging pad 101 is located a predetermined distance (i.e., 2.7 to 3.3 millimeter) below the top surface of the armrest. The first electrical connector 102 is located inside of a top portion of the armrest and the second electrical connector 103 is located outside of the armrest such that the second electrical connector 103 can easily be accessed without having to disassemble, reconfigure, or open the sofa armrest. Thus, the charging pad 101, which is embedded in the sofa armrest, may be disconnected from the wall power source by adjusting the second electrical connector 103 to be in a disconnected state (i.e., opening the second electrical 103).

Figure 38:
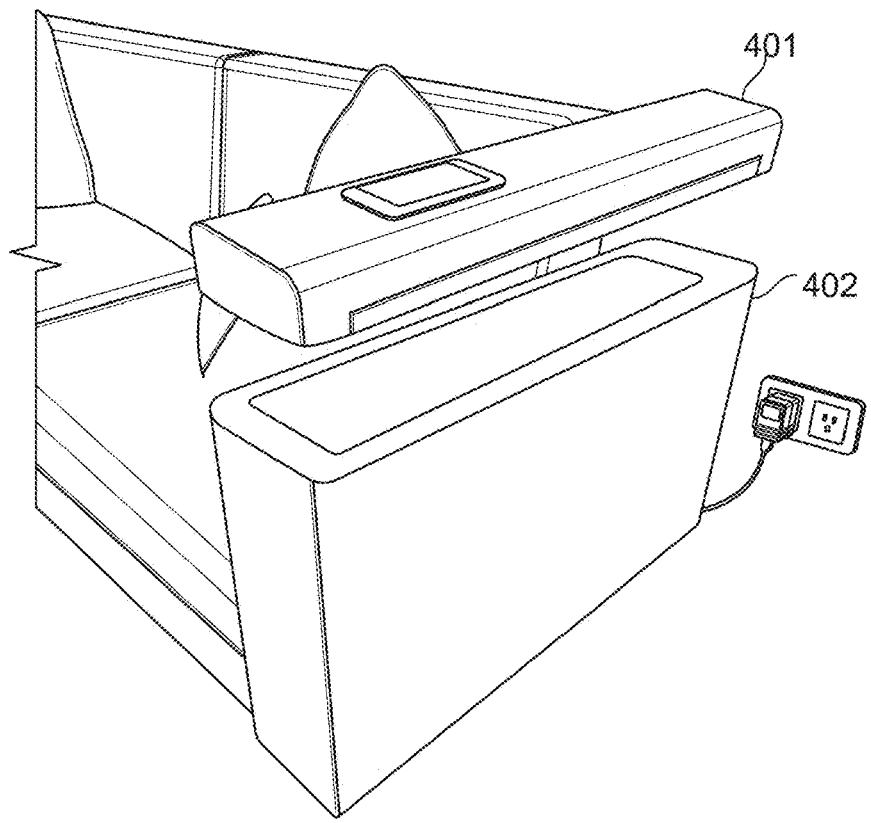
FIG. 38 shows a diagram illustrating accessing an interior of a sofa armrest via a service access point, according to an embodiment of the present disclosure.

FIG. 38 shows a diagram illustrating accessing an interior of a sofa armrest via a service access point, according to an embodiment of the present disclosure.

The service access point enables a top portion 401 of the armrest to be separated from a lower portion 402. The service access point may be a zipper or other means (i.e., a magnet or a locking mechanism) for attaching/detaching the top portion 401 to the lower portion 402. Alternatively, rather than completely separating a top portion 401 of the armrest from a lower portion 402 of the armrest, a service access point may be accessed through a pocket, hole, or window, which may be opened using a zipper, magnet, or a locking mechanism.

The service access point provides access to the charging pad 101, the first electrical connector 102, and/or the second electrical connector 103 when they are located inside of the armrest.

According to the present disclosure, a power charger can easily be replaced by using the service access point. For example, a user may notice that his or her electronic device (i.e. mobile phone) is not properly charging, and he or she may be inclined to attempt to fix the wireless charger. If the charger continues to not be working properly, then the user may decide that it is necessary to gain access to the charging pad 101 to troubleshoot it and/or replace it. Alternatively, if the user cannot gain access to the charging pad 101, then the user may decide it is necessary to replace the entire piece of furniture which houses the charging pad 101.

The service access point provides access to the interior of the sofa armrest, thereby allowing the user to troubleshoot and/or replace a portion of the wireless charger. For example, the first electrical connector 102 and/or the second electrical connector 103 may be switched to a disconnected state so that the top portion 401 of the armrest can be separated from the lower portion 402 of the armrest without wires limiting physical access to the service access point.

Thus, the service access point may allow a user to replace the wireless charger without having to replace the sofa armrest. In other words, if the wireless charger is built into the sofa armrest and cannot easily be accessed, then a user may be inclined to replace the sofa armrest and/or the sofa if the wireless charger is not operating properly.

Figure 39:
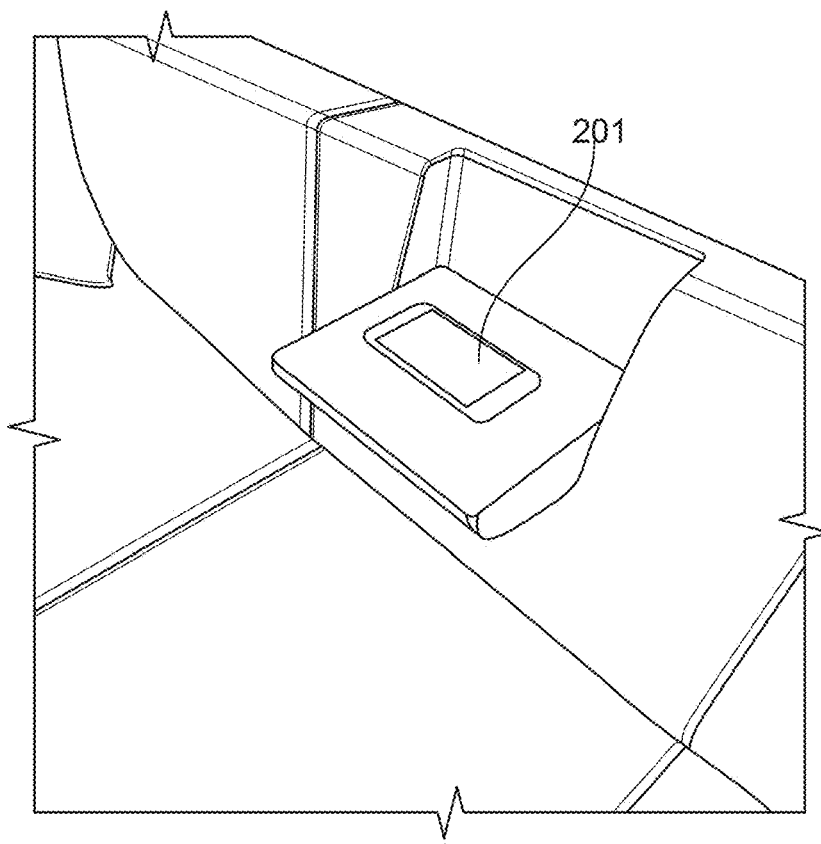
FIG. 39 shows a diagram illustrating a sofa cushion with a wireless charger embedded therein, according to an embodiment of the present disclosure.

FIG. 39 shows a diagram illustrating a configuration of a wireless charger embedded in a sofa cushion, according to an embodiment of the present disclosure.

Referring to FIG. 39, the sofa cushion may flip down to provide access to the embedded wireless charger. That is, the charging pad 101 of the wireless charger can be located in a sofa cushion that may be opened from a first position to a second position. The first position may be a regular sofa orientation which a sofa cushion can be ordinary used (i.e., by allowing the user to sit on or against it). The second position may be a flipped down position of a portion of the sofa cushion which may provide an area for an electronic device 201 to be placed such that a wireless charger embedded in the flipped down portion of the sofa provides wireless charging to the electronic device 201.

Figure 40:
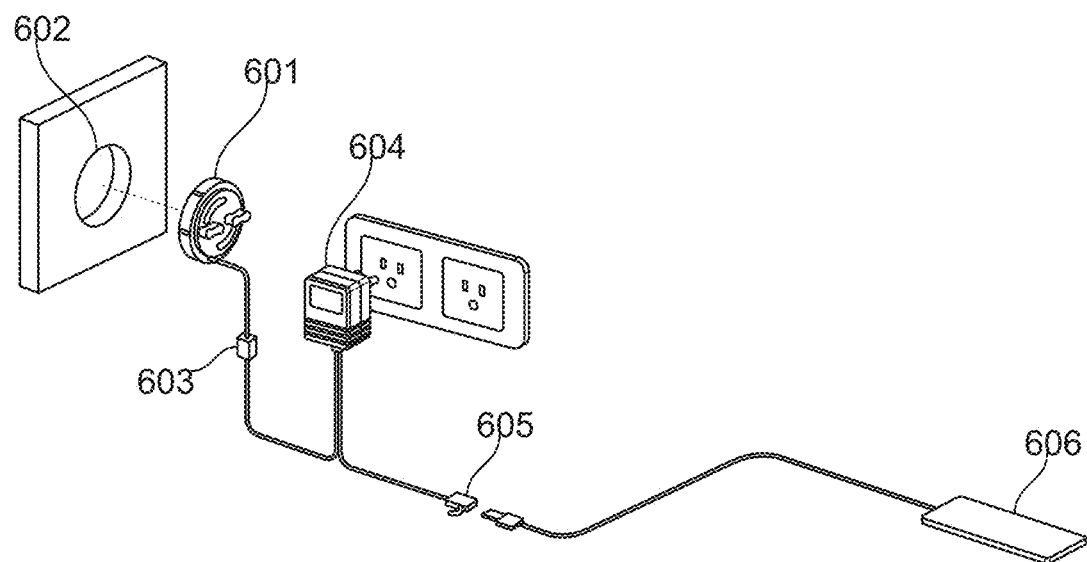
FIG. 40 shows a diagram illustrating a configuration of a charger, according to an embodiment of the present disclosure.

FIG. 40 shows a diagram illustrating a configuration of a charger, according to an embodiment of the present disclosure.

Referring to FIG. 40, a wireless charging pad (i.e., a coil for electromagnetic induction) may be located inside of a locking mechanism 601. The coil may be wound around a central point for generating an electromagnetic field. The locking mechanism 601 may snugly fit inside of a pre-bored hole 602. The locking mechanism 601 including the wireless charging pad can then be placed into a section of the sofa.

Sofas and other furniture for use with a wireless charging pad may contain pre-bored holes, which may be custom-made by a furniture factory. The pre-bored holes may be located on the bottom of, on the side of, on the top of, inside of, or outside of furniture to accommodate the wireless charging device. For example, a wireless charging device having a locking mechanism 601 may be placed into one of the pre-bored holes 602 and placed into a locked position such that an edge of the furniture is flush. Additionally, a furniture cover may be placed over the locking mechanism 601 in the pre-bored hole 602.

When the locking mechanism 601 is placed into a pre-bored hole, a user may lock the locking mechanism 601 into place to affix a charger to the furniture. When it is desirable to remove the charger, a customer may unlock the locking mechanism 601 to remove it from the furniture. The locking mechanism 601 may include part or all of the charger. The charger may be a wired charger or a wireless charger.

The locking mechanism 601 may be connected by a first wire to an electrical connector 603, which is connected to a wall power supply 604. A USB power extension may be connected to the wall power supply 604 such that power can simultaneously be output to the wireless charging pad in the locking mechanism 601 through the electrical connector 603, and to the USB power extension 605. An electronic device 606 may be connected to the USB power extension 605 to receive a charge.

In order to attach the locking mechanism 601 to the furniture, the locking mechanism 601 may be placed into a pre-bored (previously drilled) mounting hole in the furniture. Next, a twist-lock turning part of the locking mechanism 601 may be twisted in a predetermined direction (e.g., clockwise). When the locking mechanism 601 is twisted in the predetermined direction, elastic latches may protrude in a direction away from the center of the locking mechanism 601, causing the diameter of the locking mechanism 601 to increase. In this manner, the diameter of the locking mechanism 601 in the unlocked position may be less than the diameter of the locking mechanism 601 in the locked position.

By increasing the diameter of the locking mechanism 601 in the locked position, the locking mechanism 601 may be affixed to the interior walls of the pre-bored hole in the furniture. In this way, the locking mechanism 601 may be securely attached to the furniture when placed in the locked position.

Alternatively, the locking mechanism 601 may be attached to the pre-bored hole in the furniture using adhesive, latches, sliders, or clamps to fasten the wireless charger mounting mechanism into an intended position.

Accordingly, a user may make an installation decision regarding whether or not to install the locking mechanism 601 with a charging device in his/her furniture. This solution of reduces the risk of returning expensive furniture due to unsatisfactory performance of charging devices because a user may replace and/or reinstall part or all of a charging device associated with the furniture.

Figure 41:
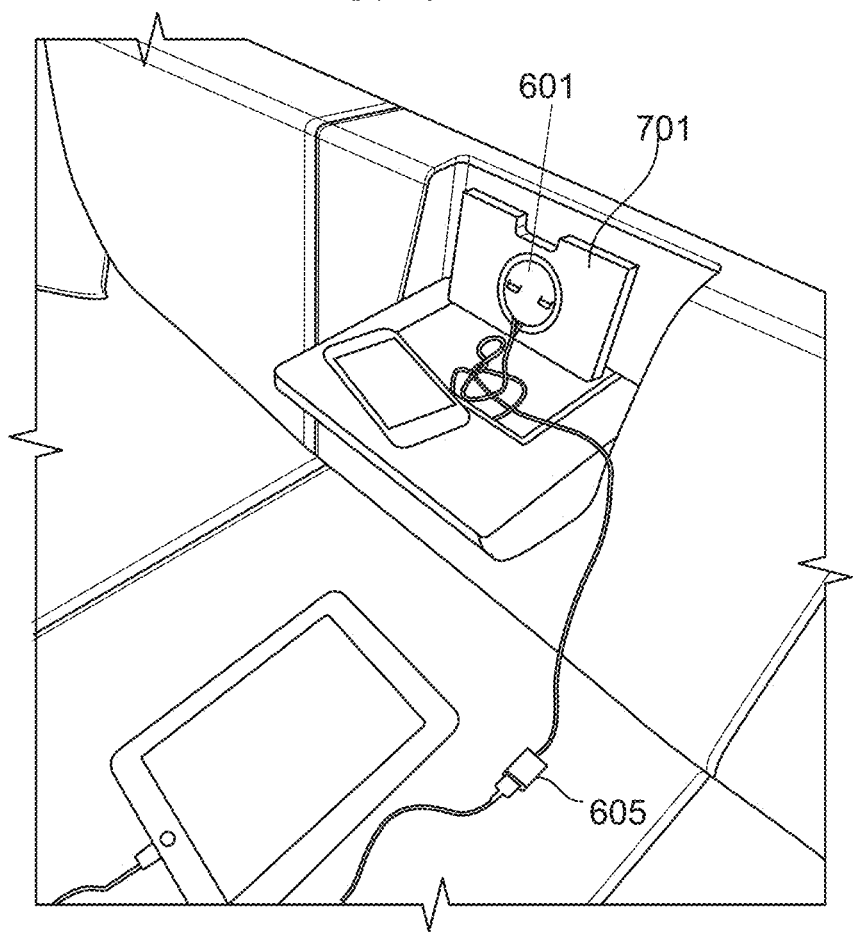
FIG. 41 shows a diagram illustrating a configuration of a charger embedded in a sofa cushion with a USB extension, according to an embodiment of the present disclosure.

FIG. 41 shows a diagram illustrating a configuration of a charger embedded in a sofa cushion with a USB extension, according to an embodiment of the present disclosure. Referring to FIG. 41, the locking mechanism 601 may be locked into place inside of a portion of a sofa cushion. As illustrated in FIG. 41, a portion of the sofa cushion can be flipped down from a first position (i.e., closed position) to a second position (open position). The locking mechanism 601 may be in a locked position in a pre-bored hole. The pre-bored hole may be a part of a cover 701 which may be opened or closed to access an inside section of the portion of the flipped-down sofa cushion. The inside section of the portion of the sofa cushion may be used to place wires (i.e., USB power extension 605) when it is not being used.

Thus, a user may flip down a portion of a sofa cushion, thereby gaining access to the locking mechanism 601 having an embedded wireless charging pad. A user may charge a first electronic device by placing it on or near the locking mechanism 601 having the embedded wireless charging pad. The user may simultaneously charge a second electronic device by connecting it to the USB power extension 605.

Figure 42:
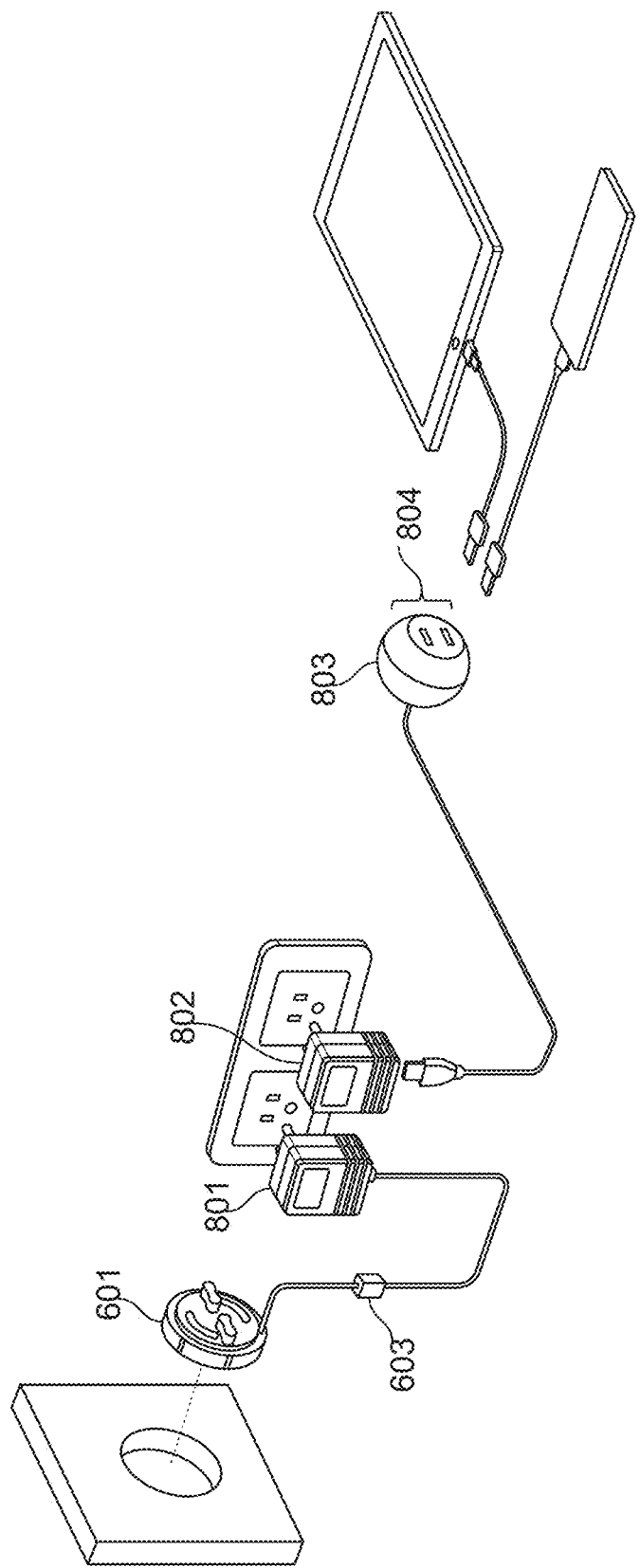
FIG. 42 shows a diagram illustrating a configuration of a wireless charger and a configuration of a wired ball USB charger, according to an embodiment of the present disclosure.

FIG. 42 shows a diagram illustrating a configuration of a wireless charger and a configuration of a wired ball USB charger, according to an embodiment of the present disclosure.

Referring to FIG. 42, a locking mechanism 601, including a wireless charging pad embedded therein, is connected to the power supply 801 through the electrical 603. The power supply 801 connects directly to the electrical 603 to provide power to the wireless charging pad embedded in the locking mechanism 601.

Additionally, a second power supply 802 may provide power to a USB ball charger 803. The USB ball charger 803 may be detachable from the second power supply 802 and may have two USB ports 804 for simultaneously charging two electronic devices through the two USB ports 804. In this manner, the USB ball charger 803 can easily be moved and placed in the best suited location for charging electronic devices.

Figure 43:
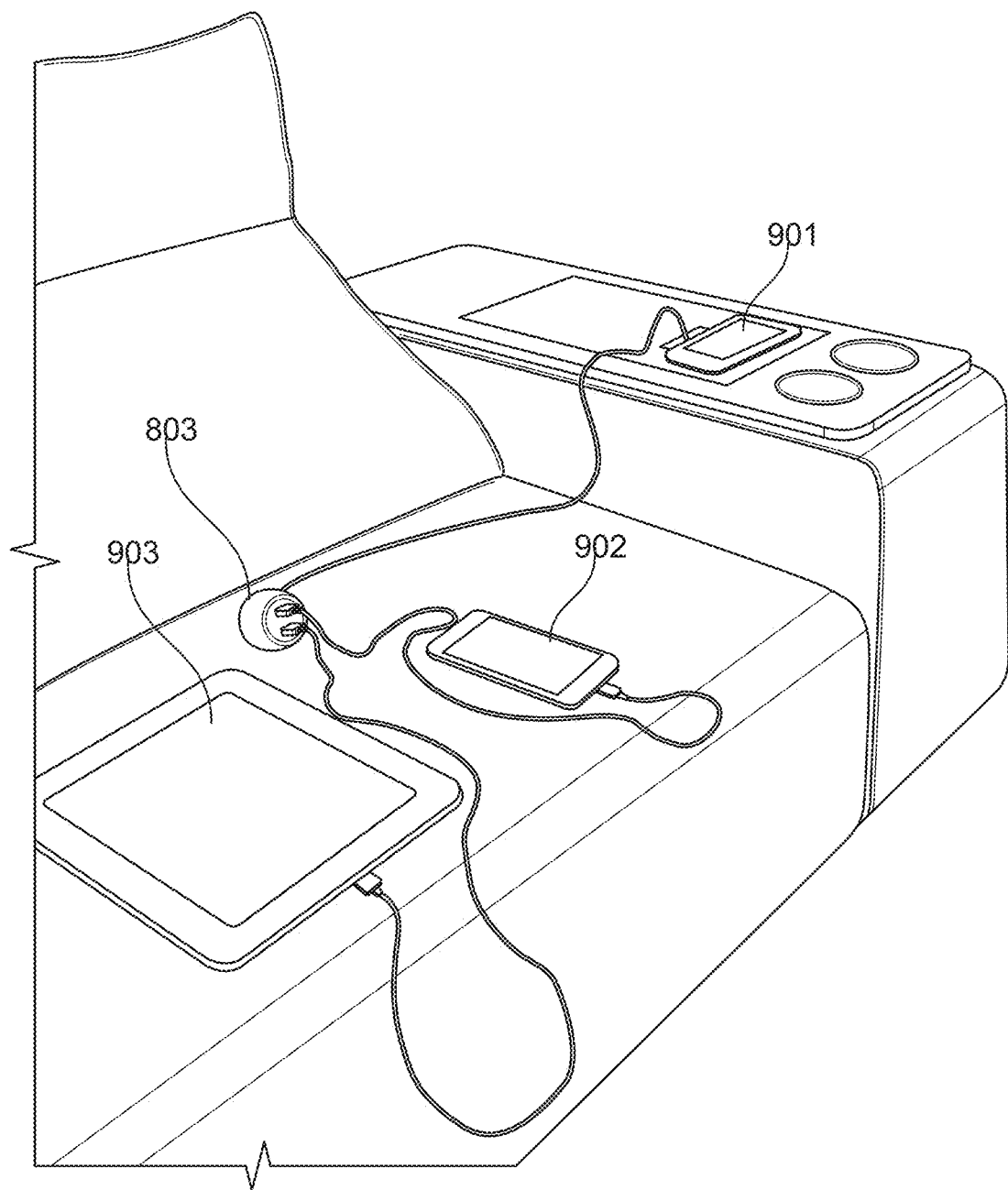
FIG. 43 shows a diagram illustrating a configuration of a charger embedded in a middle section with additional power outlets and a wired ball USB splitter, according to an embodiment of the present disclosure.

FIG. 43 shows a diagram illustrating a configuration of a charger embedded in a middle section with additional power outlets and a wired ball USB splitter, according to an embodiment of the present disclosure.

Referring to FIG. 43, three electronic devices may simultaneously be charged. A first electronic device 901 may wirelessly be charged through a wireless charging pad embedded into a middle section of a sofa. The first electronic device 901 may be placed on a portion of the middle section of the sofa that has a wireless charging pad embedded thereunder. For example, a wireless charging pad may be embedded into a locking mechanism, which can be inserted into a pre-bored hole. The locking mechanism may be hidden from view when the middle section of the sofa is in the closed position. That is, the pre-bored hole may be located on an inner surface of a door and/or flap such that the side of the door and/or flap opposite the locking mechanism provides a flush surface on which an electronic device 901 can wirelessly be charged.

Additionally, a second electronic device 902 and a third electronic device 903 can simultaneously be charged through the ball charger 803. The second electronic device 902 and the third electronic device 903 can be simultaneously charged while the first electronic device 901 is wirelessly being charged.

Figure 44:
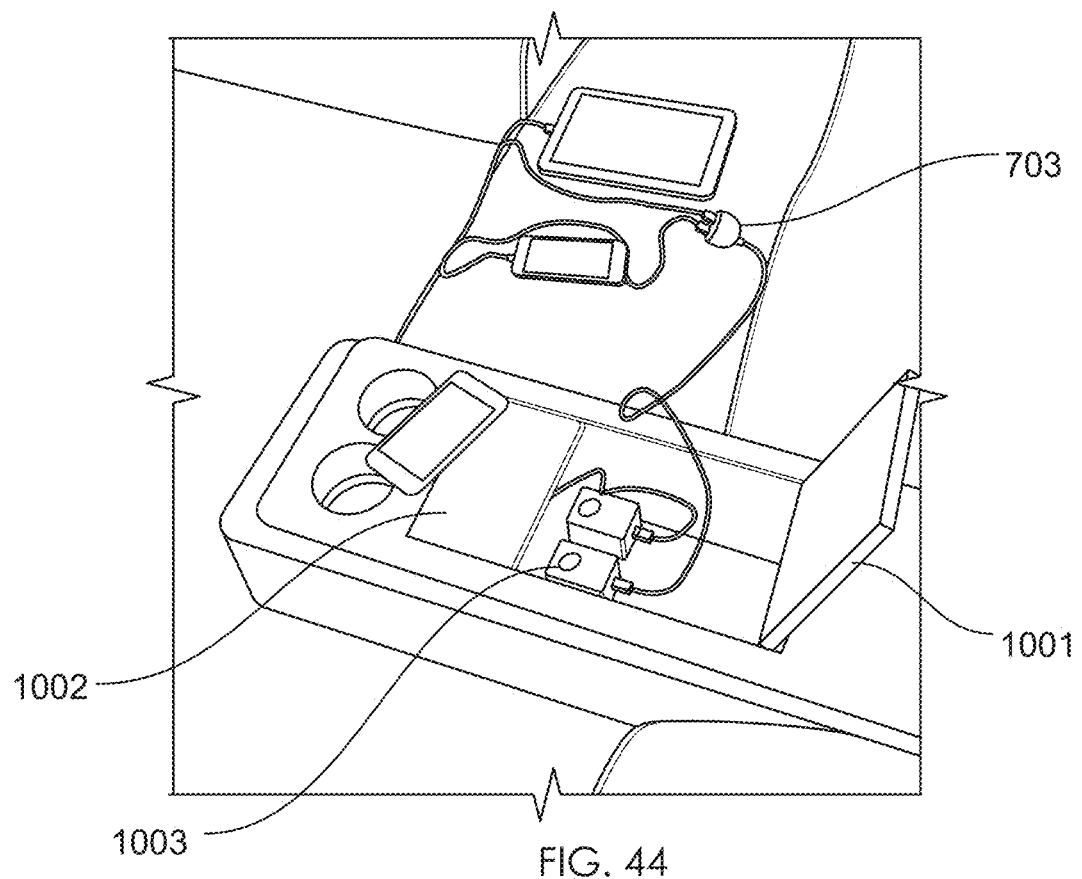
FIG. 44 shows a diagram illustrating an interior configuration of a charger embedded in a middle section with additional power outlets and a wired ball USB splitter, according to an embodiment of the present disclosure.

FIG. 44 shows a diagram illustrating an interior configuration of a charger embedded in a middle section with additional power outlets and a wired ball USB splitter, according to an embodiment of the present disclosure.

The middle section of the sofa may include hidden power outlets 1003 which are accessible by flipping open a small door 1001. The middle section may also include a wireless charger 1002 embedded therein.

Figure 45:
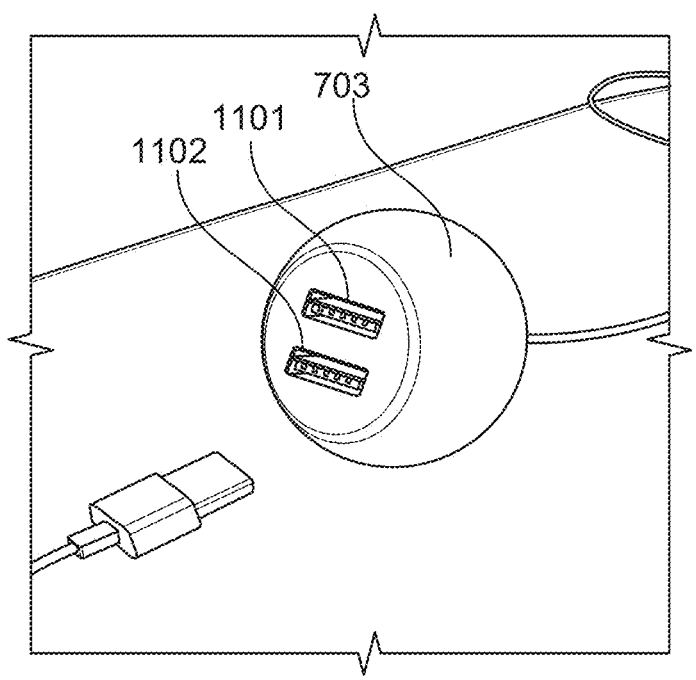
FIG. 45 shows a diagram illustrating a wired ball USB splitter, according to an embodiment of the present disclosure.

FIG. 45 shows a diagram illustrating a wired ball USB splitter, according to an embodiment of the present disclosure.

Referring to FIG. 45, the USB splitter may be a USB ball charger 803 (i.e., a half moon charger) capable of providing different power outputs to a first USB output socket 1101 and a second USB output socket 1102 according to what type of electronic device is plugged into each output socket.

The USB ball charger may include one or more custom integrated circuits (ICs) which may include a large variety of standards and protocols to communicate with many different types of electronic devices. For instance, when a first type of electronic device is connected to the USB output socket 1101, a custom IC may identify the type of electronic device by communicating with an external IC of the first electronic device and determine a first output power for charging. When a second type of electronic device is connected to the second USB output socket 1102, the custom IC may identify the second type of electronic device by communicating with an external IC of the second electronic device and determine a second output power for charging.

Additionally, the custom ICs may prioritize charging. For instance, when a first type of electronic device requires a relatively large power usage for charging when compared to a second type device, then the custom IC may distribute power in a way to ensure that both devices are charged according to their factory specifications. This may mean that the lower power usage device (i.e., the second type device) may first be charged completely and the higher power usage device may be charged after the lower power usage device is finished charging.

Figure 46:
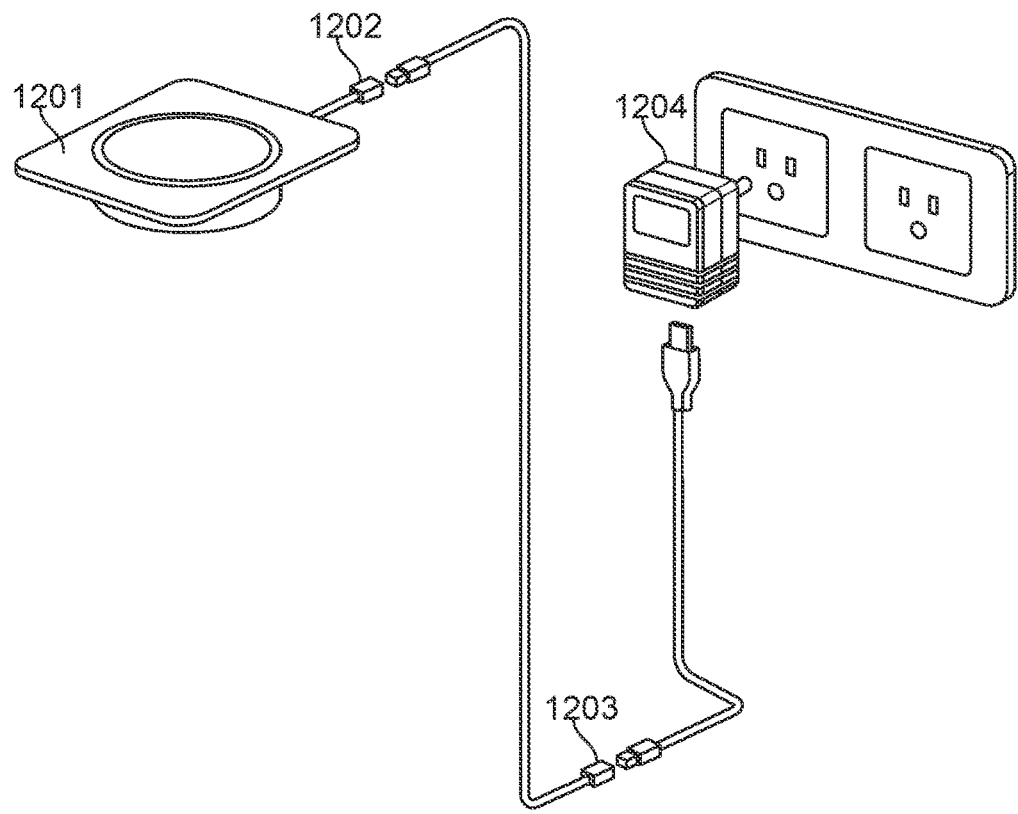
FIG. 46 shows a diagram illustrating a configuration of a wireless charger, according to an embodiment of the present disclosure.

FIG. 46 shows a diagram illustrating a configuration of a wireless charger, according to an embodiment of the present disclosure.

The wireless charger of FIG. 46 includes a charging pad 1201. The charging pad 1201 includes a coil capable of producing an electromagnetic field that extends outward from the charging pad 1201. The coil may be embedded inside the charging pad 1201 so that an electronic device may be positioned in the electromagnetic field by being placed on top of the surface of the charging pad 1201. The charging pad 1201 may be attached to a first cable which connects to a first electrical connector 1202.

The first electrical connector 1202 is connected to a second cable which is connected to a second electrical connector 1203. The second electrical connector 1203 is connected to a third cable which connects to the wall power supply 1204. The first electrical connector 1202 and the second electrical connector 1203 are detachable such that either one may be used to connect or disconnect the charging pad 1201 from the wall power supply 1204. Additionally, the third cable may be detachable from the wall power supply 1204 such that the wall power supply 1204 may be disconnected from the second electrical connector 1203.

In particular, the wall power supply 1204 may include a USB port for the third cable to be connected to. The wall power supply 1204 may connect to a standard United States power supply of 120 volts (V) at 60 hertz (Hz), or may be connected to other power supply voltages and/or frequencies (i.e., alternating current and/or direct current power).

The first electrical connector 1202 and the second electrical connector 1203 are detachable, therefore the wireless charger may be detached from the second cable, the third cable, and the wall power supply 1204. Likewise, the wall power supply 1204 may be detached from the second cable, the first cable, and the wireless charger.

Figure 47:
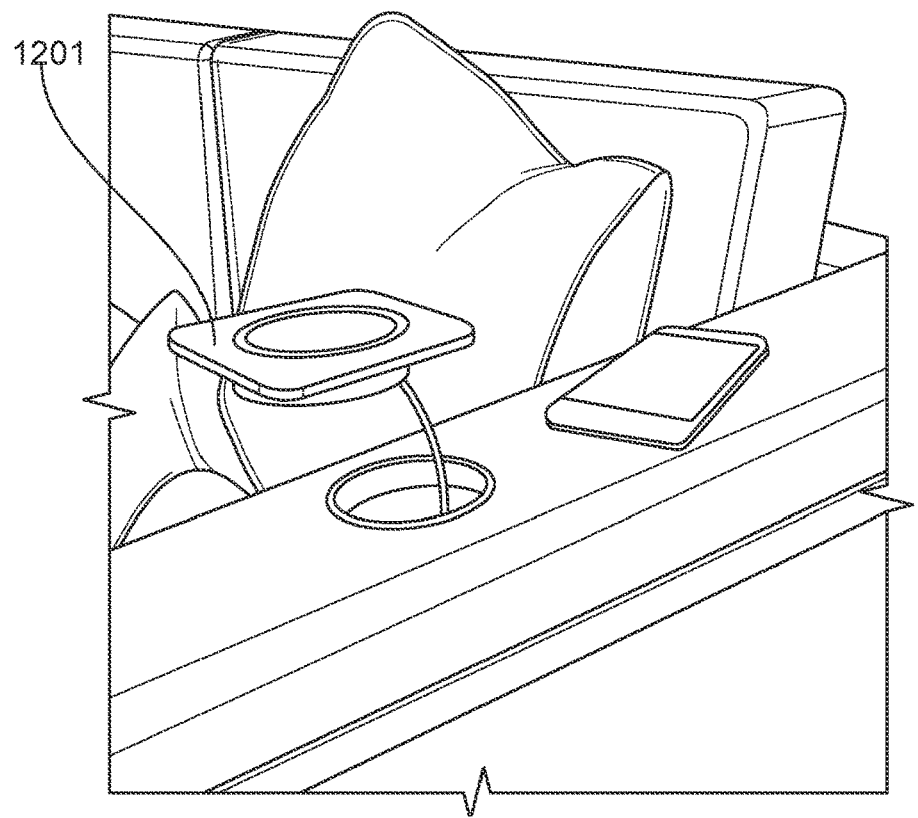
FIG. 47 shows a diagram illustrating a configuration of a wireless charging pad placed in a drink holder of an armrest, according to an embodiment of the present disclosure.

FIG. 47 shows a diagram illustrating a configuration of a wireless charging pad placed in a drink holder of an armrest, according to an embodiment of the present disclosure.

Referring to FIG. 47, the wireless charging pad 1201 may be formed to fit into a cup holder on an armrest of the sofa. Specifically, the bottom side of the wireless charging pad 1201 may be a shaped circularly so as to fit inside of the cup holder on the armrest of the sofa. In this manner, the wireless charging pad 1201 may appear to be attached to the armchair of the sofa because the wireless charging pad 1201 can be fitted to the cup holder. Additionally, the cable which attaches the wireless charging pad 1201 to the first electrical may run through the cup holder to access the interior of the sofa armchair. Therefore, the cable will not be visible when the wireless charger 1201 is placed into the cupholder.

Figure 48:
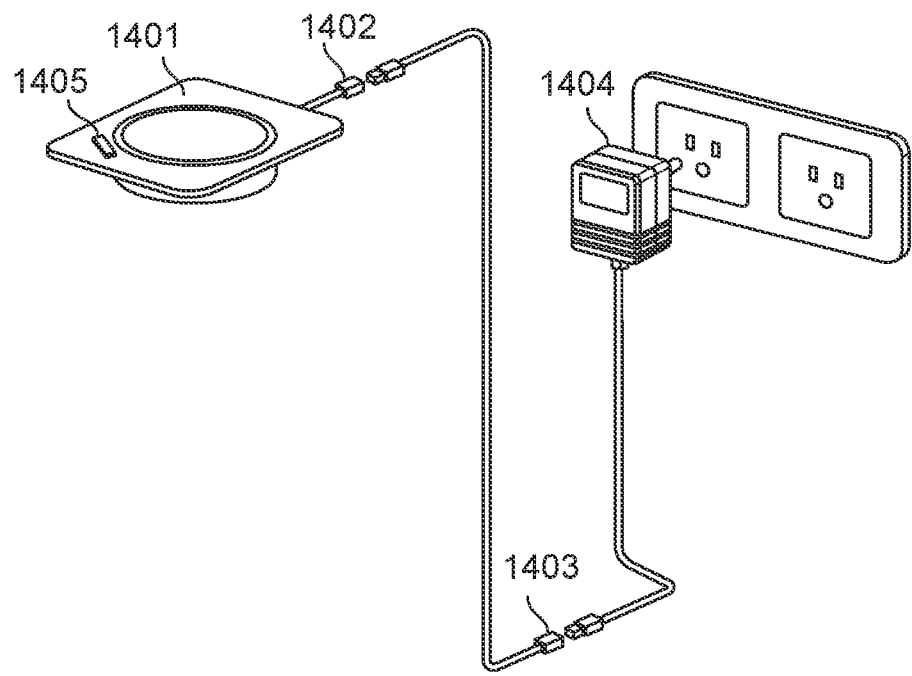
FIG. 48 shows a diagram illustrating a configuration of a wireless charger with a USB port for wired charging, according to an embodiment of the present disclosure.

FIG. 48 shows a diagram illustrating a configuration of a wireless charger with a USB port for wired charging, according to an embodiment of the present disclosure. Referring to FIG. 48, the wireless charger includes a charging pad 1401. The charging pad 1401 includes a coil capable of producing an electromagnetic field that extends outward from the charging pad 1401. The coil may be embedded inside the charging pad 1401 so that an electronic device may be positioned in the electromagnetic field by being placed on top of the surface of the charging pad 1401.

In addition to including a wireless charger embedded therein, the charging pad 1401 may also include a USB port 1405 positioned on the exterior of the charging pad 1401. This configuration may allow for a user to wirelessly charge a first electronic device on the charging pad 1401 and to simultaneously charge a second electronic device through the USB port 1405.

The charging pad 1401 may be attached to a first cable which connects to a first electrical connector 1402. The first electrical connector 1402 may be connected to a second cable which may be connected to a second electrical connector 1403. The second electrical connector 1403 may be connected to a third cable which connects to the wall power supply 1404. The first electrical connector 1402 and the second electrical connector 1403 may be detachable such that either one may be used to connect or disconnect the charging pad 1401 to the wall power supply 1404.

The wall power supply 1404 may connect to a standard United States power supply of 120 volts (V) at 60 hertz (Hz), or may be connected to other power supply voltages and/or frequencies (i.e., alternating current and/or direct current power).

The first electrical connector 1402 and the second electrical connector 1403 may be detachable, therefore the wireless charger may be detached from the second cable, the third cable, and the wall power supply 1404. Likewise, the wall power supply 1404 may be detached from the second cable, the first cable, and the wireless charger.

Figure 49:
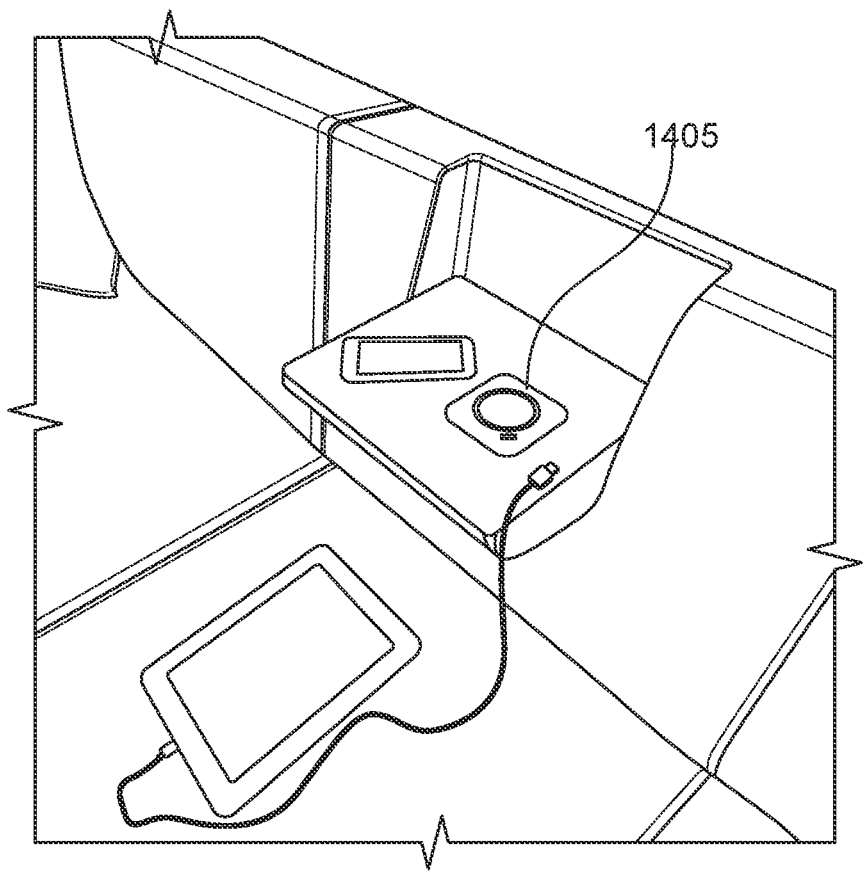
FIG. 49 shows a diagram illustrating a sofa cushion with a wireless charger positioned on a flip-down portion of a cushion, according to an embodiment of the present disclosure.

FIG. 49 shows a diagram illustrating a sofa cushion with a wireless charger positioned on a flip-down portion of a cushion, according to an embodiment of the present disclosure.

Referring to FIG. 49, the sofa cushion may flip down to provide access to the wireless charger. That is, the charging pad 1405 of the wireless charger can be located in a sofa cushion that may be opened from a first position to a second position. The first position may be a regular sofa orientation which a user can sit and/or ordinarily use a cushion. The second position may provide an area for an electronic device to be placed such that a wireless charger embedded in or placed on the flipped down portion of the sofa provides wireless charging to the electronic device.

Figure 50:
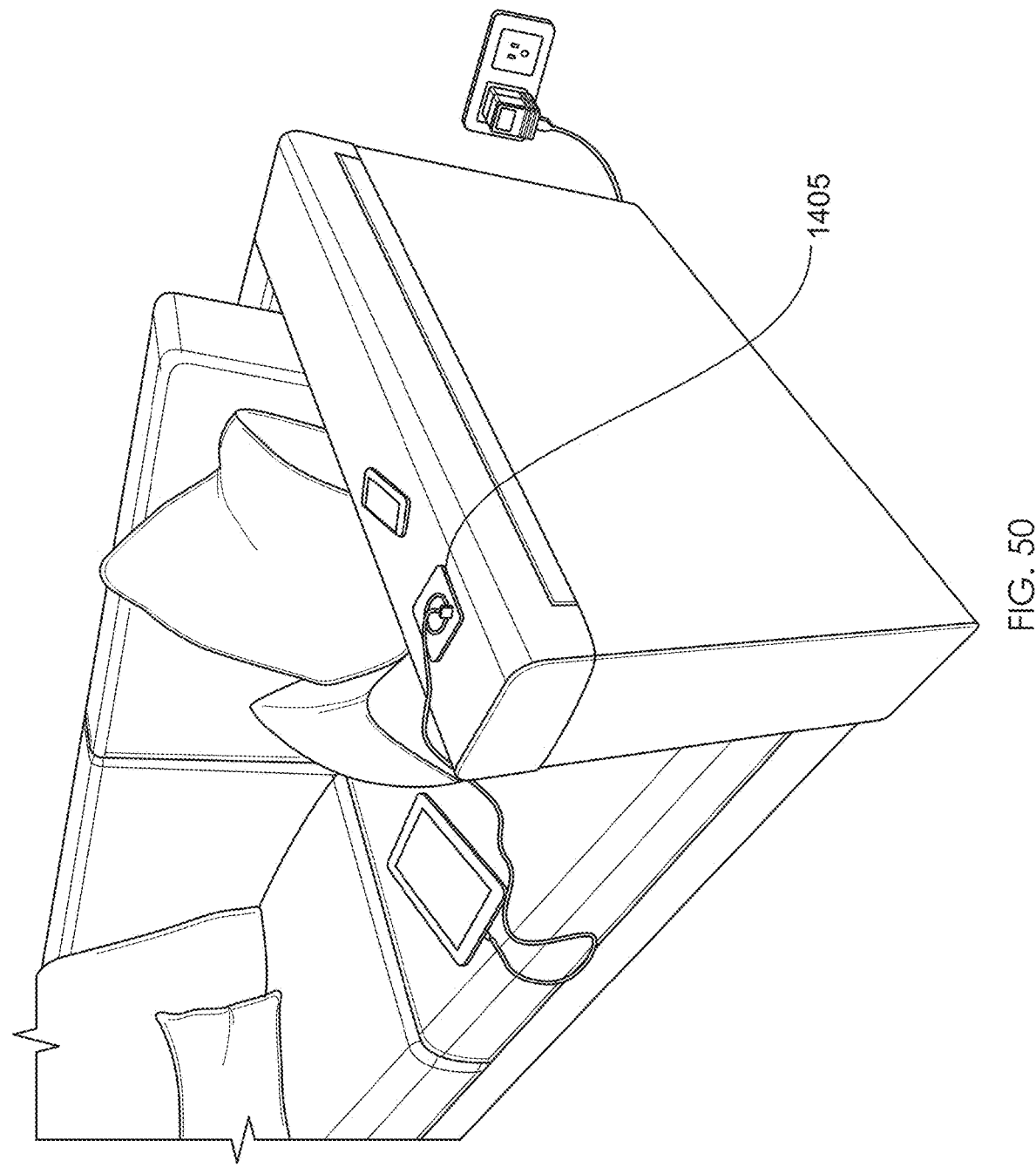
FIG. 50 shows a diagram illustrating a sofa armrest with a wireless charger with a USB port, according to an embodiment of the present disclosure.

FIG. 50 shows a diagram illustrating a sofa armrest with a wireless charger with a USB port, according to an embodiment of the present disclosure.

Referring to FIG. 50, the charging pad 1405 of the wireless charger can be positioned on top of the sofa armrest. The charging pad 1405 can wirelessly charge a first electronic device by placing it near or on top of the charging pad 1405. Additionally, the charging pad 1405 can charge a second electronic device through a USB port located on the surface of the charging pad 1405.

FIGS. 51-55 are directed to a structure and operation of a charging system that performs charging through a non-transparent furniture panel. For example, the non-transparent furniture panel may not allow visible light and/or infrared radiation to visibly pass through a surface thereof.

Figure 51:
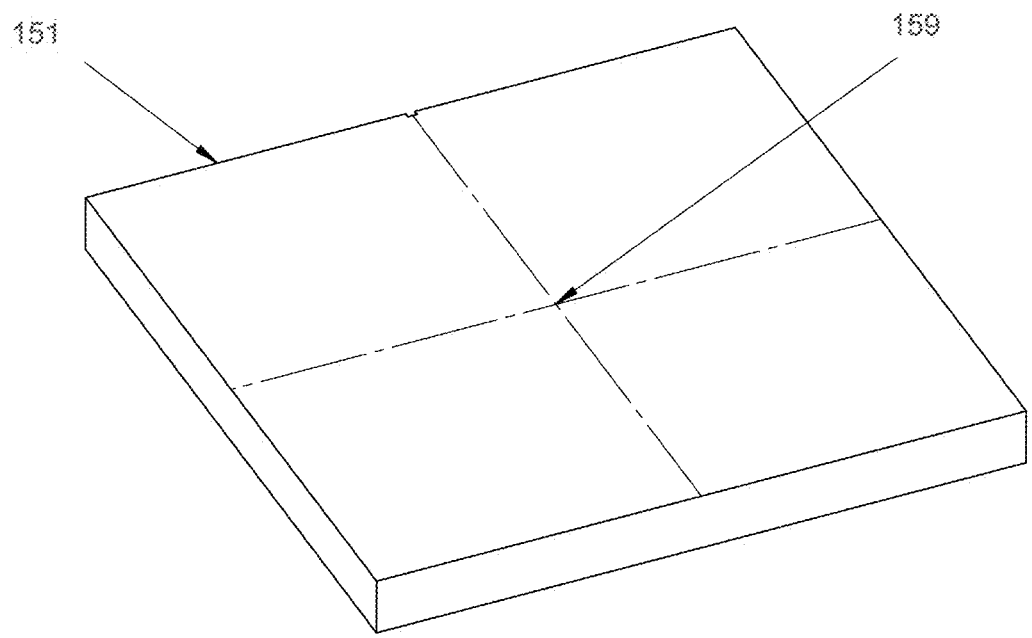
FIG. 51 shows a perspective view of a charging system through a furniture panel that is non-transparent to visible and infrared light, according to an embodiment of the present disclosure.
Figure 52:
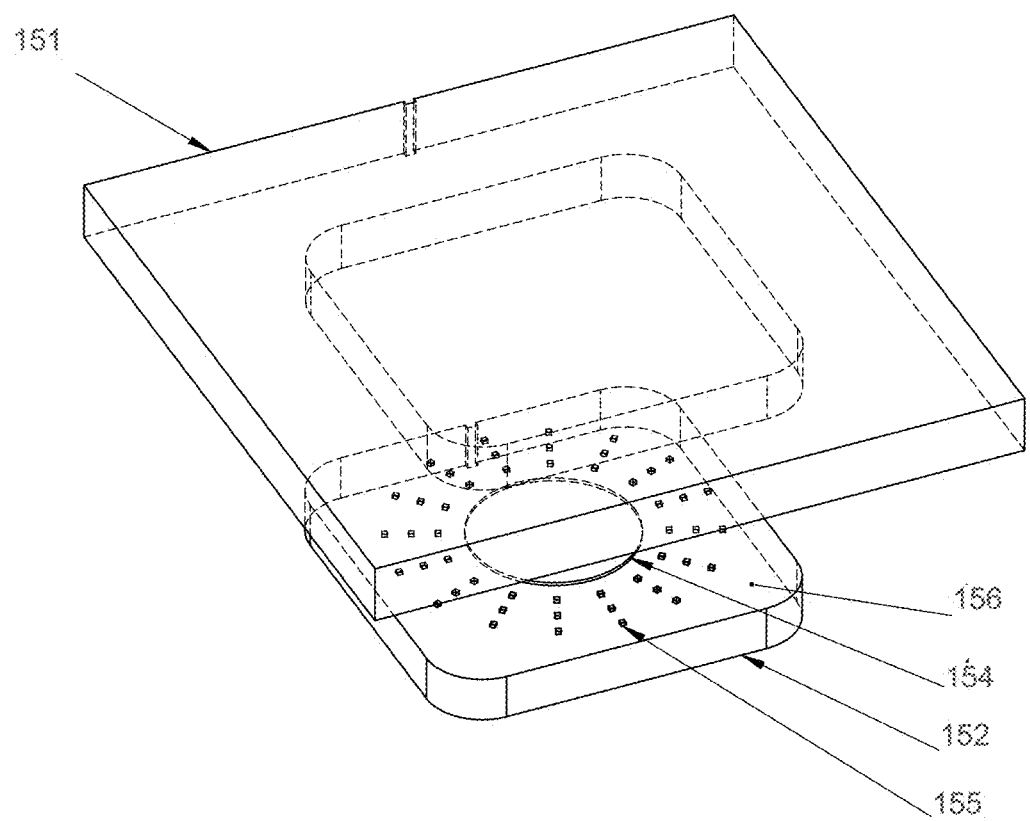
FIG. 52 shows an exploded perspective view of a charging system with a charging module, according to an embodiment of the present disclosure.
Figure 53:
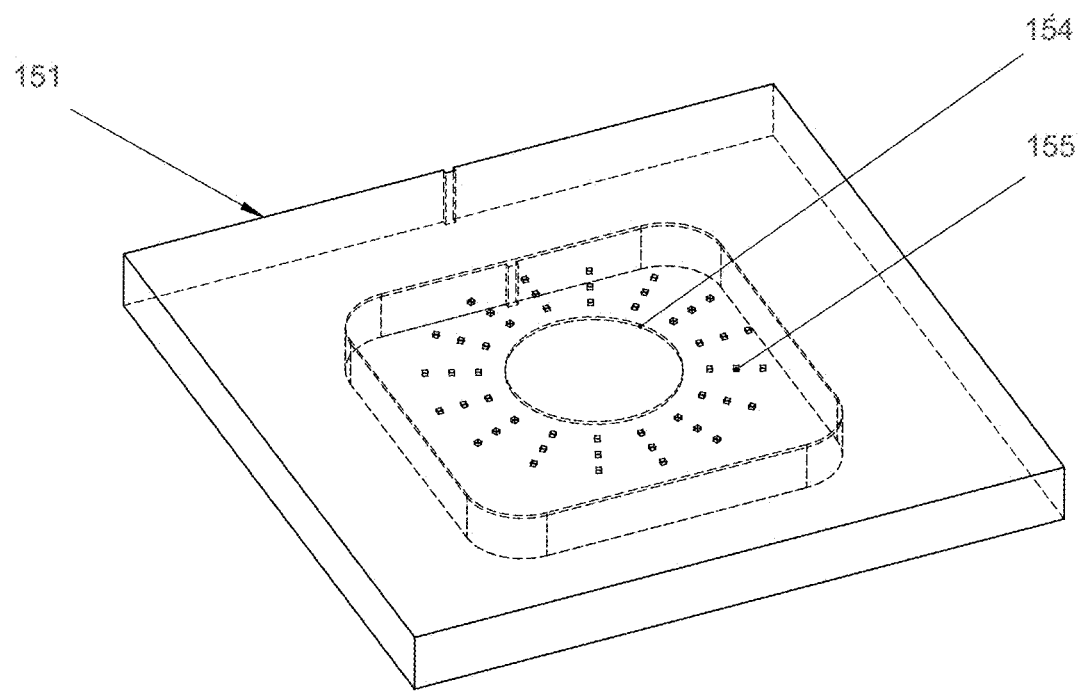
FIG. 53 shows an exploded perspective view of a loading system with a loading module shown, according to an embodiment of the present disclosure.
Figure 54:
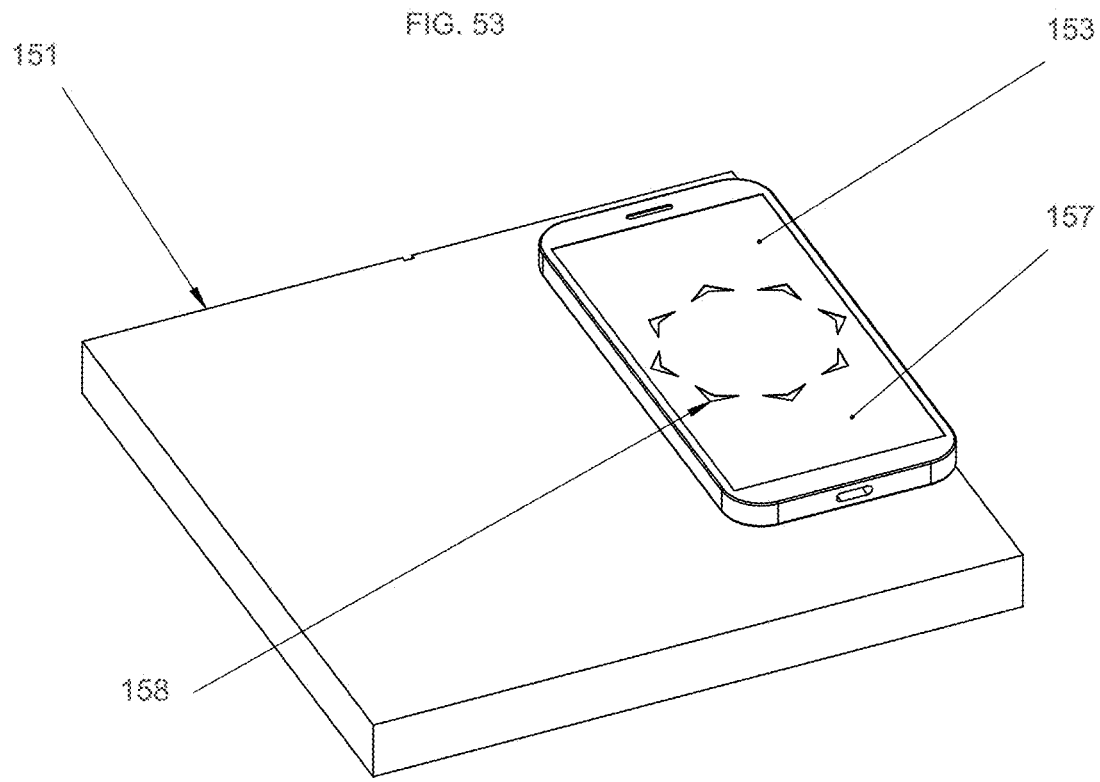
FIG. 54 shows a perspective view of a charging system that is performing charging through a furniture panel with details of the charging displayed on the energy receiver, according to an embodiment of the present disclosure.
Figure 55:
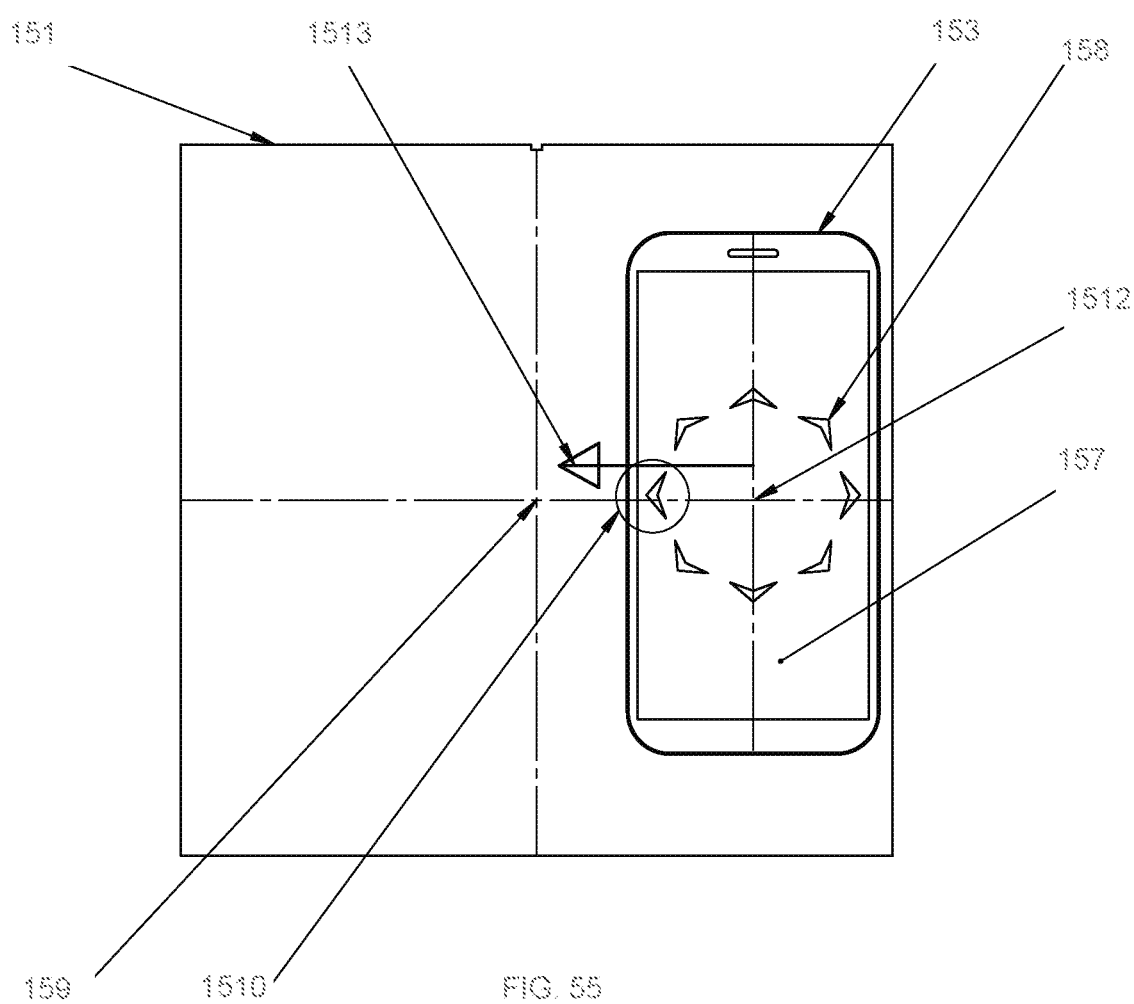
FIG. 55 shows a view illustrating a function of a positioning system, according to an embodiment of the present disclosure.

FIG. 51 shows a perspective view of a charging system through a furniture panel that is non-transparent to visible and infrared light, according to an embodiment of the present disclosure. FIG. 52 shows an exploded perspective view of a charging system with a charging module, according to an embodiment of the present disclosure. FIG. 53 shows an exploded perspective view of a loading system with a loading module shown, according to an embodiment of the present disclosure. FIG. 54 shows a perspective view of a charging system that is performing charging through a furniture panel with details of the charging displayed on the energy receiver, according to an embodiment of the present disclosure. FIG. 55 shows a view illustrating a function of a positioning system, according to an embodiment of the present disclosure.

Referring to FIGS. 51-55, a charging system may include of a furniture board 151 (e.g., a non-transparent, wooden, and/or solid board) that provides a charging and mounting location for the charging module 152 (e.g., a portable wireless communication device). The charging module 152 may be mounted (e.g., positioned) on the bottom of the board 1 and equipped with an energy transmitter 154 (e.g., an induction coil for transmitting wireless power) and a matrix 156 of position sensors 155. The position sensors 155 may be arranged in a predetermined pattern such that each position sensor 155 is spaced apart from each other position sensor 155 by a specified distance. In response to the board 151 not being transparent, the applied position sensors 155 operate according to capacitive signals, radio signals or other principle signals which permit transmission through a non-transparent board material (e.g., wood).

The wireless energy transmitter and wireless energy receiver most efficiently operate when placed at an ideal orientation at a center 159 of the transmitter (e.g., the board 151) and a center 1512 of the receiving device 153. The correct arrangement of the above-mentioned system elements is possible thanks to the installation of an internal smartphone application 157 in the receiving device 153, which will enable a display on the receiving device 153 to display suggestions (e.g., direction arrows that suggest a movement and/or point towards the center 159) 158 of the movement 1513 in relation to the board 151.

The display of the receiving device 153 may display a position correction icon 1510 (e.g., a direction arrow that is illuminated or highlighted) when an energy receiver included in the device 153 is positioned within a predetermined distance along the surface of the board 151 in relation to the transmitter 154. For example, if the device 153 moves 1513 in a direction towards the center 159 of the board 151, and a horizontal distance from the transmitter 154 to the device 153 is less than a predetermined number (e.g., 5 centimeters), then the device 153 may display the position correction icon 1510 indicating a direction towards the center 159. Accordingly, the application 157 may notify the user of the correct positioning of the transmitter means with respect to the power receiver. Additionally or alternatively, the application 157 may provide an audible notification.

FIGS. 56-60 are directed to a structure and operation of a charging system that performs charging through a transparent furniture panel. For example, the transparent furniture panel may allow visible light and/or infrared radiation to visibly pass through a surface thereof.

Figure 56:
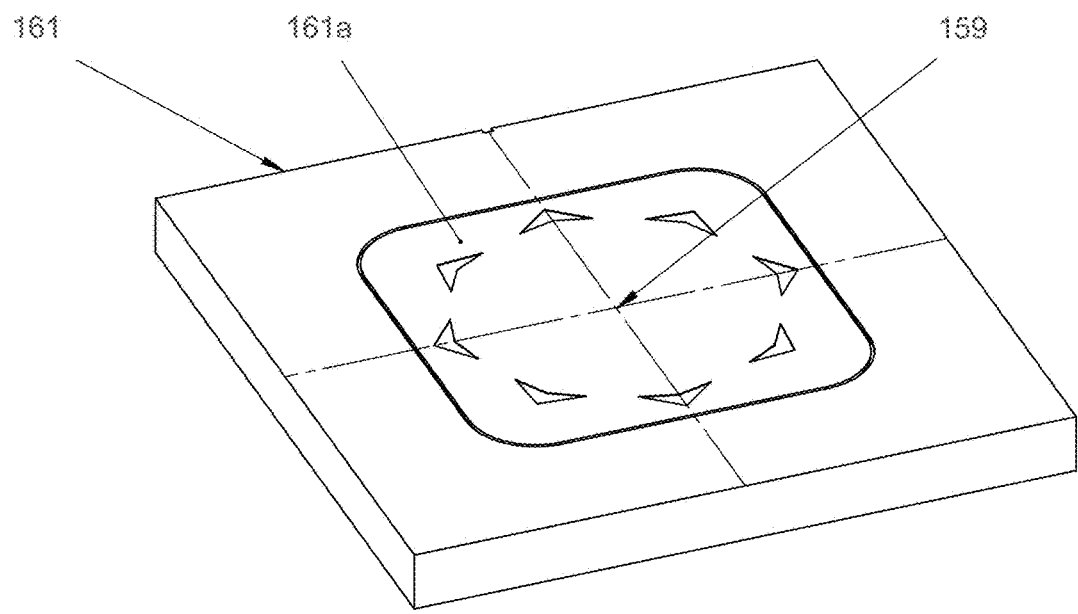
FIG. 56 shows a perspective view of a charging system performing charging through a furniture panel and a transparent decorative element, according to an embodiment of the present disclosure.
Figure 57:
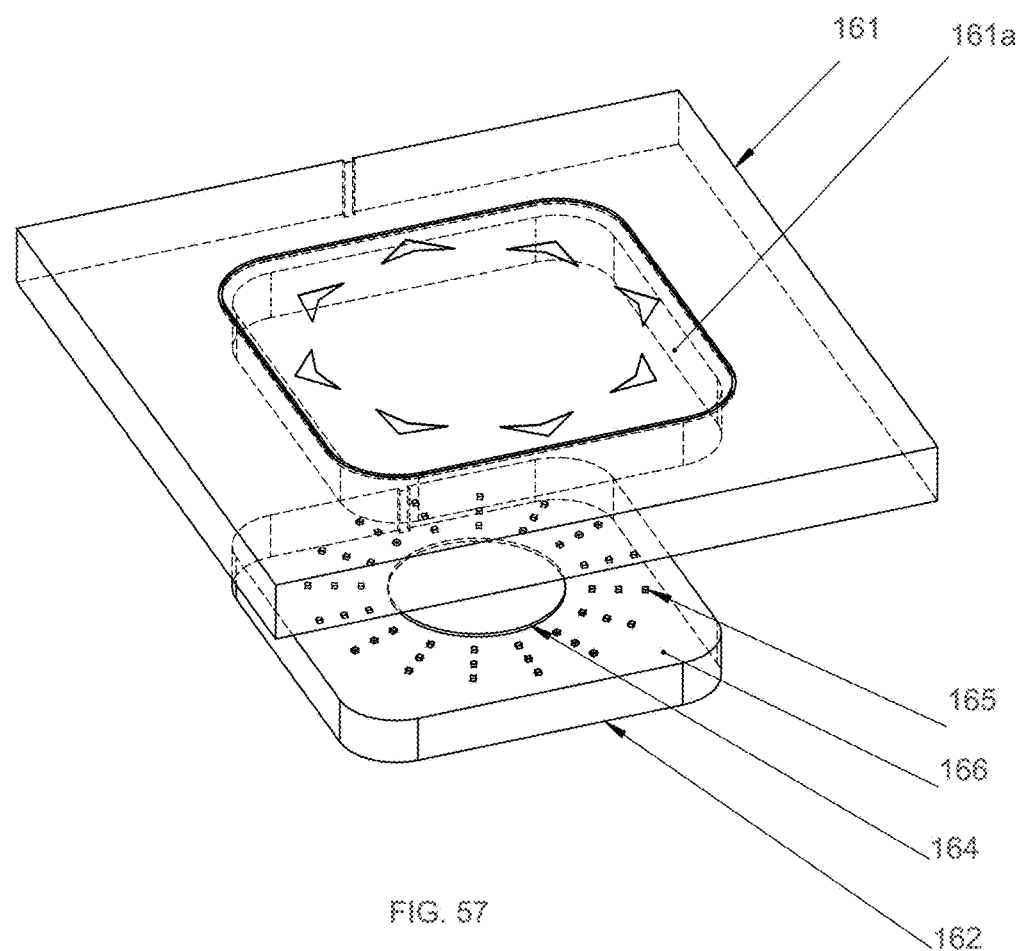
FIG. 57 shows an exploded perspective view of a charging system with a charging module, according to an embodiment of the present disclosure.
Figure 58:
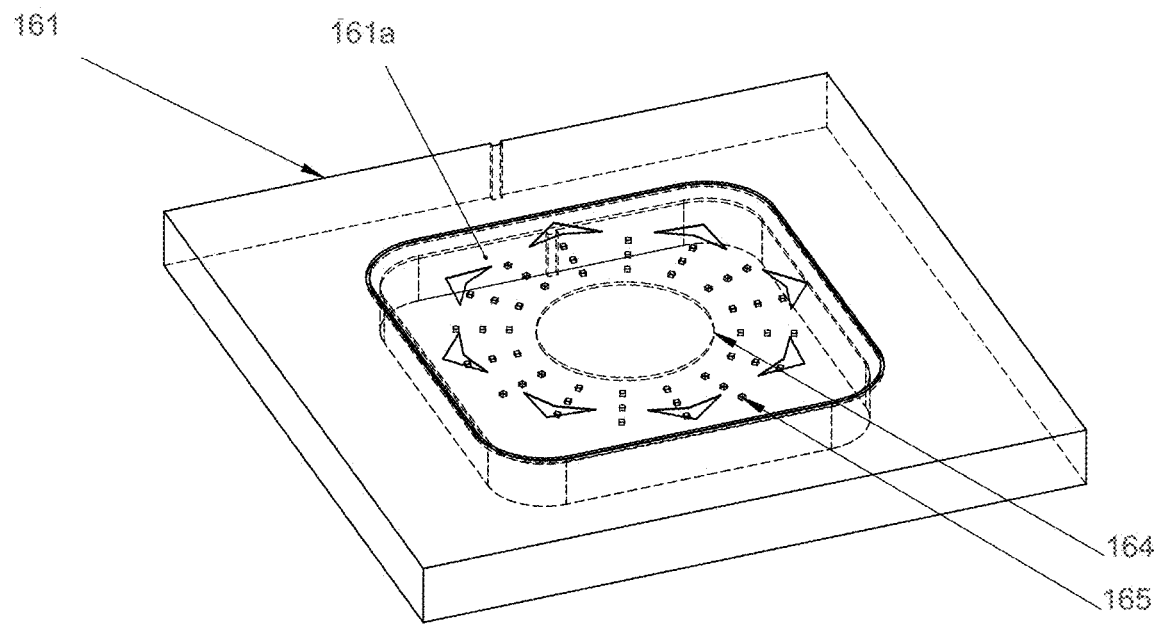
FIG. 58 shows an exploded perspective view of a loading system with a loading module shown, according to an embodiment of the present disclosure.
Figure 59:
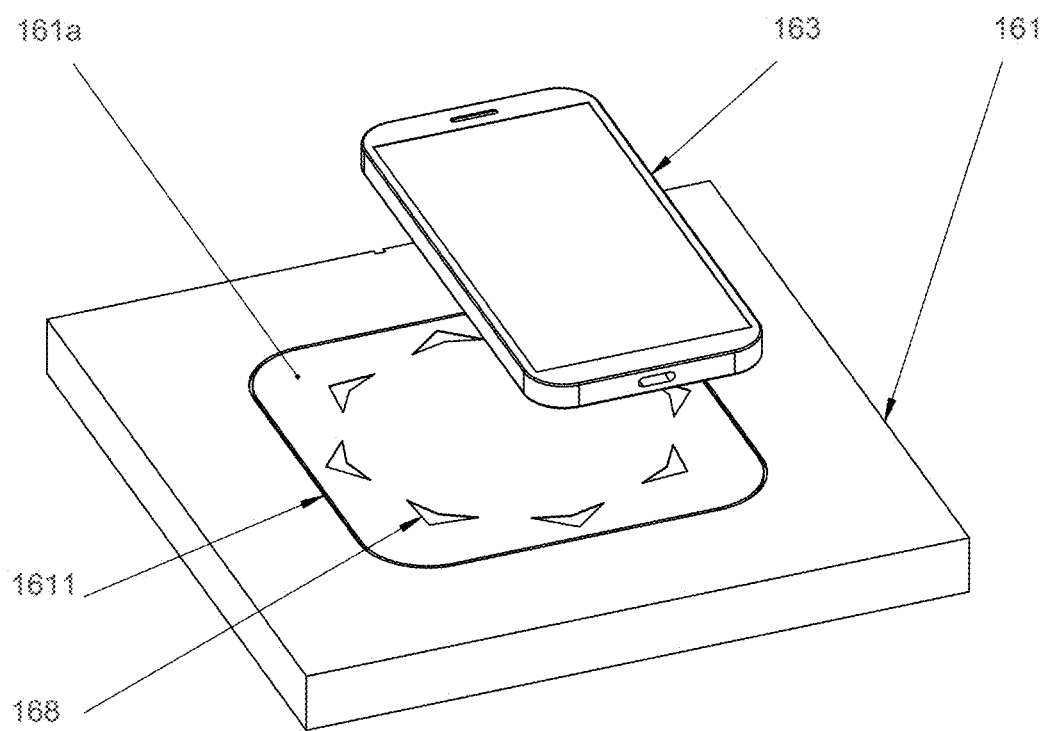
FIG. 59 shows a perspective view of a charging system performing charging through a furniture panel and a transparent decorative element, according to an embodiment of the present disclosure.
Figure 60:
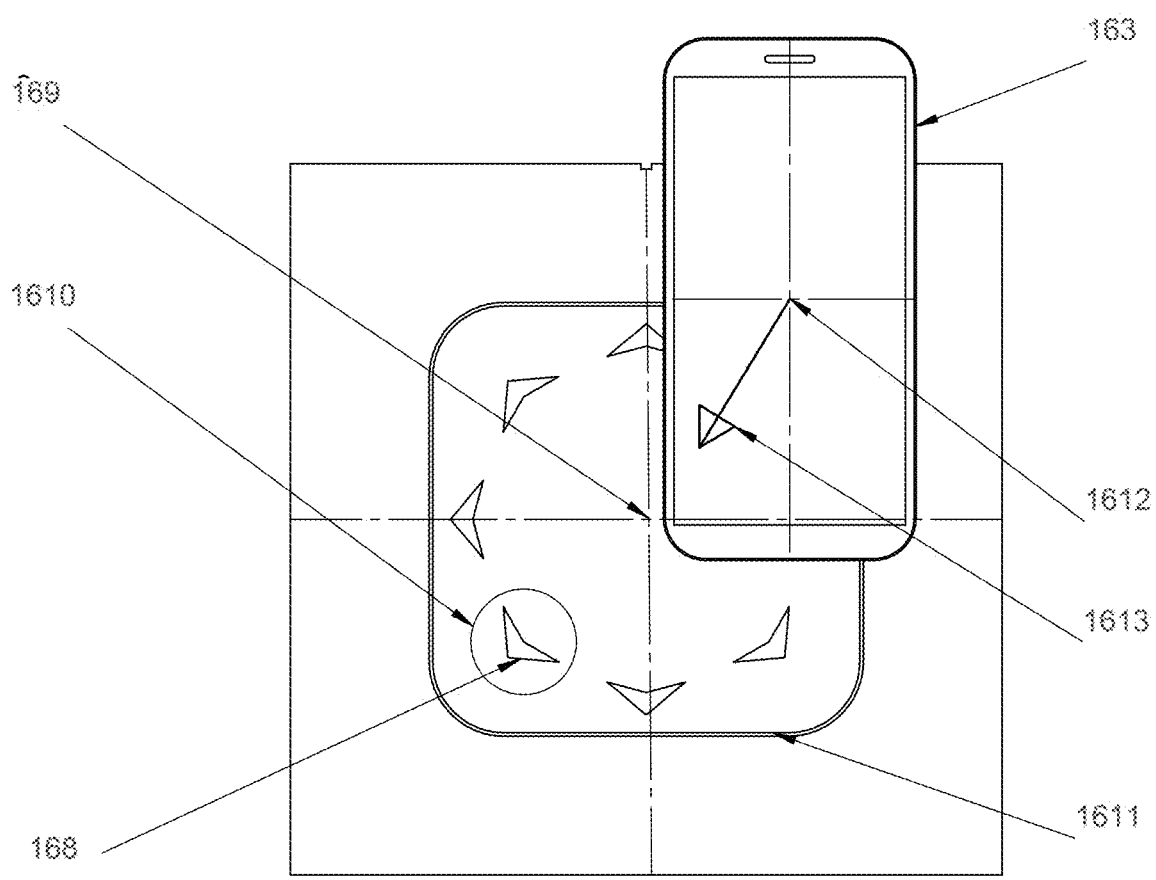
FIG. 60 shows a view illustrating a function of a positioning system, according to an embodiment of the present disclosure.

FIG. 56 shows a perspective view of a charging system performing charging through a furniture panel and a transparent decorative element, according to an embodiment of the present disclosure. FIG. 57 shows an exploded perspective view of a charging system with a charging module, according to an embodiment of the present disclosure. FIG. 58 shows an exploded perspective view of a loading system with a loading module shown, according to an embodiment of the present disclosure. FIG. 59 shows a perspective view of a charging system performing charging through a furniture panel and a transparent decorative element, according to an embodiment of the present disclosure. FIG. 60 shows a view illustrating a function of a positioning system, according to an embodiment of the present disclosure.

Referring to FIGS. 56-60, a charging system may include of a furniture board 161 (e.g., a non-transparent, wooden, and/or solid board) that provides a charging and mounting location for the charging module 162 (e.g., a portable wireless communication device). In addition, the board 161 may include an additional central flat element 161a that is transparent and may allow visible light and/or infrared radiation to visibly pass through a surface thereof. In other words, the furniture board 161 may not be transparent (e.g., the furniture board 161 may be made of wood), and the central flat element 161a may be transparent (e.g., the central flat element 161a may be made of a clear plastic material). The charging module 162 may be mounted (e.g., positioned) on the bottom of the board 1 and/or flat element 161a and equipped with an energy transmitter 164 (e.g., an induction coil for transmitting wireless power) and a matrix 166 of position sensors 165. The position sensors 165 may be arranged in a predetermined pattern such that each position sensor 165 is spaced apart from each other position sensor 165 by a specified distance. In response to the board 161 and/or flat element 161a being transparent, visible light, infrared radiation, or other wireless transmission signals may be transmitted through the board 161. That is, the board 161 and/or flat element 161a may include a transparent surface and display information through the transparent surface.

The wireless energy transmitter and wireless energy receiver most efficiently operate when placed at an ideal orientation at a center 169 of the transmitter (e.g., the board 161) and a center 1612 of the receiving device 163. The correct arrangement of the above-mentioned system elements is possible without necessarily installing a smartphone application in the receiving device 163. Rather, a display may be included in the board 161 and/or flat element 161a to display suggestions (e.g., direction arrows that suggest a movement and/or point towards the center 169) 168 of the movement 1613 in relation to the board 161.

The display of the board 161 and/or flat element 161a may display a position correction icon 1610 (e.g., a direction arrow that is illuminated or highlighted) when an energy receiver included in the device 163 is positioned within a predetermined distance along the surface of the board 161 in relation to the transmitter 164. For example, if the device 163 moves 1613 in a direction towards the center 169 of the board 161, and a horizontal distance from the transmitter 164 to the device 163 is less than a predetermined number (e.g., 5 centimeters), then the board 161 and/or flat element 161a may display the position correction icon 1610 indicating a direction towards the center 169. Additionally or alternatively, the board 161 and/or flat element 161a may project light signals from a light ring 1611 on the surface of the board 161 and/or flat element 161a.

While the disclosure has been shown and described with reference to a certain preferred embodiment thereof, it will be understood by those skilled in the art that various changes in form and details may be made therein without departing from the spirit and scope of the disclosure.

The invention claimed is:

1. A panel device comprising:
   a surface including an energy transfer zone;
   at least one coil configured to generate an electromagnetic field for wirelessly charging an external electronic device that is positioned in the energy transfer zone; and
   an internal drive unit configured to rotate or move the panel device in relation to an exterior object in proximity to the panel device,
   wherein the internal drive unit is configured to move the surface of the panel device in an X axis, a Y axis, or a Z axis, and to rotate the panel device in a rotation angel α about the X axis, a rotation angle β about the Y axis, or a rotation angle γ about the Z axis.

2. The panel device of claim 1, wherein the panel device is connected to a holder that is attached to the exterior object,
   wherein the internal drive unit, in conjunction with the holder, is configured to move the panel device among at least one of an X axis, a Y axis, or a Z axis.

3. The panel device of claim 1, further comprising:
   a battery configured to provide electricity to the at least one coil.

4. The panel device of claim 1, further comprising:
   a handle attached to another surface of the panel device,
   wherein the handle is provided with a position locking mechanism configured to attach or detach the panel device in a pivotable joint to a clamp positioned on the exterior object in proximity to the panel device.

5. The panel device of claim 4, wherein the position locking mechanism is configured to attach or detach the panel device from the handle using a spring-loaded pin moved by a pusher.

6. The panel device of claim 1, further comprising:
   a solar cell configured to generate electricity,
   wherein the electricity generated by the solar cell is used by the coil to generate the electromagnetic field.

7. The panel device of claim 1, wherein the surface of the panel device comprises a display device.

8. The panel device of claim 1, wherein the surface includes a heating station configured to radiate heat.

9. The panel device of claim 1, further comprising an illumination device configured to project light in an upward direction, a downward direction, an upward and a downward direction at the same time, or an outward peripheral direction,
wherein a direction in which light is projected is selectable by a user of the panel device.

10. The panel device of claim 9, further comprising a motion sensor configured to control an activation state of the illumination device.

11. The panel device of claim 1, further comprising:
a temperature sensor configured to sense a temperature, a humidity sensor configured to sense a humidity, or an environmental parameter sensor configured to sense an environmental parameter of where the panel device is located.

12. The panel device of claim 1, further comprising:
an indicator configured to display a time or provide a notification.

13. The panel device of claim 1, wherein the panel device is configured to be controlled by a voice control system, a user gesture, or a smartphone application based on a wireless fidelity (WiFi) or infrared (IR) connection.

14. The panel device of claim 1, further comprising:
a base unit attached to the at least one coil;
a first motor configured move the base unit in a first direction; and
a second motor configured to move the base unit in a second direction perpendicular to the first direction,
wherein the first motor and the second motor are configured to redefine the charging zone by moving the base unit towards the external device.

15. The panel device of claim 1, wherein visible light, infrared radiation, radio waves, sound waves, or electromagnetic induction are used to wirelessly charge the external electronic device.

16. A panel device comprising:
a surface including an energy transfer zone;
at least one coil configured to generate an electromagnetic field for wirelessly charging an external electronic device that is positioned in the energy transfer zone;
an internal drive unit configured to rotate or move the panel device in relation to an exterior object in proximity to the panel device; and
a position sensor matrix configured to recognize a position of the external electronic device on the surface of the panel device based on modulation of current drawn by the external electronic device,
wherein the panel device is configured to visually display or audibly indicate at least one direction for identifying an optimal charging position for charging the external electronic device based on the recognized position.

17. The panel device of claim 16, wherein the surface of the panel device is transparent and includes a display screen configured to display the at least one direction.

18. The panel device of claim 16, wherein the surface of the panel device is not transparent,
wherein the position sensor matrix comprises sensors for transmitting capacitive, radio, or other non-visible radiation through the surface, and
wherein the external electronic device is configured to display the at least one direction.

19. A panel device comprising:
a surface including an energy transfer zone;
at least one coil configured to generate an electromagnetic field for wirelessly charging an external electronic device that is positioned in the energy transfer zone;
an internal drive unit configured to rotate or move the panel device in relation to an exterior object in proximity to the panel device; and
a position sensor matrix configured to recognize a position of the external electronic device on the surface of the panel device based on modulation of current drawn by the external electronic device,
wherein the panel device is configured to visually display or audibly indicate at least one direction for identifying an optimal charging position for charging the external electronic device based on the recognized position.

* * * * *